United States Patent [19]

Asija

[11] 4,270,182
[45] May 26, 1981

[54] AUTOMATED INFORMATION INPUT, STORAGE, AND RETRIEVAL SYSTEM

[76] Inventor: Satya P. Asija, 1641 Cumberland St., Apt. 21, St. Paul, Minn. 55117

[21] Appl. No.: 537,551

[22] Filed: Dec. 30, 1974

[51] Int. Cl.³ .............................................. G06F 15/40
[52] U.S. Cl. ..................................... 364/900; 364/300
[58] Field of Search .................... 444/1; 340/172.5; 364/200 MS File, 300, 900 MS File

[56] References Cited

U.S. PATENT DOCUMENTS

| Re. 26,429 | 8/1968 | Kaufman et al. | 340/172.5 |
| 4,016,540 | 4/1977 | Hyatt | 364/200 |

OTHER PUBLICATIONS

Simmons, R. F., "Natural Language Processing," Datamation, vol. 12, Issue 6, Jun. 1966, pp. 61-63, 65, 67, 69, 71, 72.

"IBM System/360 and System/370 (OS) Storage and Information Retrieval System," booklet GH12-510-7-D, Sep. 1971.

*Primary Examiner*—Raulfe B. Zache

[57] ABSTRACT

SWIFT-ANSWER, which is an acronym for Special Word Indexed Full Text Alpha Numeric Storage With Easy Retrieval is a system of full text, free-form, narrative, information input, storage and retrieval. The system comprises an input device, a storage device, and an output device each capable of handling free-form text in any language. The stored information is retrieved by asking free-form, unpreprogrammed, narrative questions, in a predetermined language, for which the system presents relevant logical information units of the stored information, which most likely contain the answer to the user's question.

17 Claims, 7 Drawing Figures

AUTOMATED INFORMATION INPUT, STORAGE, AND RETRIEVAL SYSTEM

RELATED INSTRUMENT

The 'conception' of this invention was filed with the U.S. Patent Office on Sept. 21, 1973, under Disclosure Document No. 022914.

FIELD OF THE INVENTION

This invention relates to textual information input and storage with full punctuation and retrieval thereof by free-form, unpreprogrammed, narrative questions.

BACKGROUND OF THE INVENTION

It is frequently desireable to retrieve information stored by mechanical and electronic means with a flexibility comparable to what one human being uses to retrieve information stored in another human beings memory. However, known devices for such mechanized information retrieval are limited to (a) Nomenclatured method.
(b) Programmed Questions method.
(c) Unique Work Method, All these methods are inflexible, limited and cannot be used to ask free-form, unprogrammed, narrative questions.

BRIEF DESCRIPTION OF THE PRIOR ART

Nomenclatured Information Method

Under this method of information storage and retrieval, each logical information unit is given a unique number or an alpha nomenclature. The logical information unit can be retrieved only by use of said unique number or alpha nomenclature. For flexibility of retrieval, the same unit of information is sometimes given more than one nomenclature. For example, a computerized criminal history may be retrieved by the name of the criminal, social security number of the criminal, the date of birth of the criminal, or the date of the offense or the like. A limitation of this method is that the nomenclature must be pre-programmed and is not readily changeable and for all practical purposes the information is lost forever in the ocean of the information base if the nomenclature is lost.

PROGRAMMED QUESTIONS METHOD

According to this method, an information storage device, such as a general purpose electronic digital computer, is preprogrammed to maintain an up-to-date answer on a predetermined list of questions. Frequently each question has a question number, as well as a user number. The user by using the user number is authorized to get an answer to a question. As new information is given to the computer, for example, based upon the operations of that day in a factory, the computer undates the answers to the list of the questions to reflect the changes due to the additional new data. To retrieve information under this concept, a user merely needs to put in his user number as well as the question number and the computer spits out an up-to-date answer to that question on an appropriate output device provided for the purpose. A limitation of this method is that the question cannot be altered readily and it must be pre-programmed (i.e. no new questions may be asked).

Unique Work Method

According to this method, the information is stored in the computer in full text narrative form with complete punctuation etc. The information can be retrieved by using any logical combination of unique words that appear in that unit of information. For ease of programming and operation, the computer or other mechanized device is pre-programmed to regard each word of the text as a unique word that is not a common word such as, "IN, OUT, HE, SHE, IT, AM, AS, ARE, I, WE, YOU, WAS, WHO, WHERE, WHEN, WHICH," etc as delineated in table 1, infra. Obviously the information storage device must be given this list of common words, before the computer or other mechanized device can identify the unique words. A major limitation of this method is that the operator must be able to form logical instructions for the computer in terms of "And, Or, Nand, Nor" combinations of unique words. The method is only as good as the creativity of the user and does not permit the user to ask free-form, unpreprogrammed, narrative questions.

OBJECTS OF THE INVENTION

It is an object of this invention to provide a system whereby the user may ask questions in a free-form, unpreprogrammed, narrative fashion. The questions are addressed to the stored information so that the automatic system can present the logical units of information to the user which contains the answer to that question.

Another object of this invention is that the system is adaptable for use in conjunction with an electronic digital general purpose computer.

Another object of this invention is to alter, add, and amend information using physical devices, agents, and effects, so as to make the information more readily and objectively changeable, retrievable and useable.

Another object of this invention is to provide answers in matter of seconds without extensive manual intervention.

Another object of this invention is that the system permits unskilled personnel to do complex, time consuming work, in a novel, simple efficient way with little training.

Another object of this invention is to provide a microforming interface where extraordinarily large amounts of information are to be stored and the answer is not needed spontaneously.

Another object of this invention is that the Automated Information Input, Storage, & Retrieval System can be used with a plurality of languages, vernaculars, and dialects concurrently.

SUMMARY

SWIFT-ANSWER, which is an achonyn for Special Word Indexed Full Text Alpha Numeric Storage With Easy Retrieval is a system and a process of textual information input, storage and retrieval whereby the researcher of the information may ask questions in a free-form style for example in plain English, and whereby the device presents logical units of information, which contain the answer to that particular question. The system need not be foretold as to what questions may be anticipated, as long as the questions are answerable from the stored information. The system comprises an Input Process Subsystem, a Storage Subsystem, and a Retrieval Process Subsystem. The information is inputted, stored, and retrieved from the system of this invention by using the following steps of processing.

(a) Inputting the textual information with full punctuation, to an appropriate storage device, such as 3×5 cards, paper tape, magnetic disc, magnetic tape, magnetic core memory, a notebook or any other device capable of retaining intelligent information, via a pencil, a typewriter, or another device capable of inputting such information.

(b) Dividing the text into logical units of information, assigning each unit a unique number, and a location number, such that it is possible to directly access that unit of information in a random manner by using the assignment or location number alone.

(c) Inputting the common words such as, "I, WE, YOU, SHE, HE, IT, IS, AM, ARE, WAS, AND, THEY, THEM, WHO, WHY, WHERE, WHEN, WHICH, WHOSE, WHOM" etc in the alphabetical order given in Table-1, infra., for storage on a device similar to that used in step (a) but in a separate portion thereof.

(d) Copying the exact text of step (a) onto preferably a more active, and easily and randomly accessible media, such that each logical unit of information is duplicate and available at two different locations.

(e) Comparing each word of the text with each of the common words of step (c) character by character, and discarding a word from the text if a match occurs or retaining it in case of a mismatch, beyond a pre-established criteria.

(f) Adding synonyms and searchonyms of the retained words to all saved words. (Whereas synonyms have the same meaning even when standing alone, searchonyms have the same meaning in a given context only. See Table-2 infra.)

(g) Sorting and inserting each word saved in steps (e) and (f) in its proper alphabetical order, such that the entire compilation of saved words is in alphabetical order, rather like in a conventional dictionary.

(h) Assigning a logical information unit number and location number against each word in the dictionary compiled in step (g) from which they stem, as shown in tables 3 & 4.

(i) Framing and inputting the user's question.

(j) Comparing each word of the question with each of the common words of step (c) and discarding the word in case of a match and saving it in case of mismatch beyond the pre-established criteria. (This step is analogous to step (e) although used for a different purpose)

(k) Adding synonyms and searchonyms of the saved words from the question to the words saved in step (j). This step is analogus to step (f) supra.

(l) Sorting and inserting each word of step (k) in its proper alphabetical order, such that the entire compilation of the words saved from the researcher's question and their phononyms, synonyms and searchonyms are in alphabetical order, rather like in a conventional dictionary. (See table-2 infra.)

(m) Matching each word saved in step (g) with each word saved in step (l).

(n) Copying the logical information unit number and location number of step (h) in case of a match in step (m) upto a pre-establised criteria, against each word of step (l), such that words cited pluraly have multiple citations appearing against them.

(o) Rearranging the logical information unit numbers gleaned in step (n) supra in descending order of the frequency of their citation against all words saved in step (l), while retaining their location numbers copied in step (n).

(p) Presenting the logical information units to the questioner, in the order established in step (o) on an output device provided for the purpose.

(q) Repeating steps (i) through (p) in case of no response or for the next question.

DESCRIPTION OF THE PREFERRED EMBODIMENT

Figure 1:
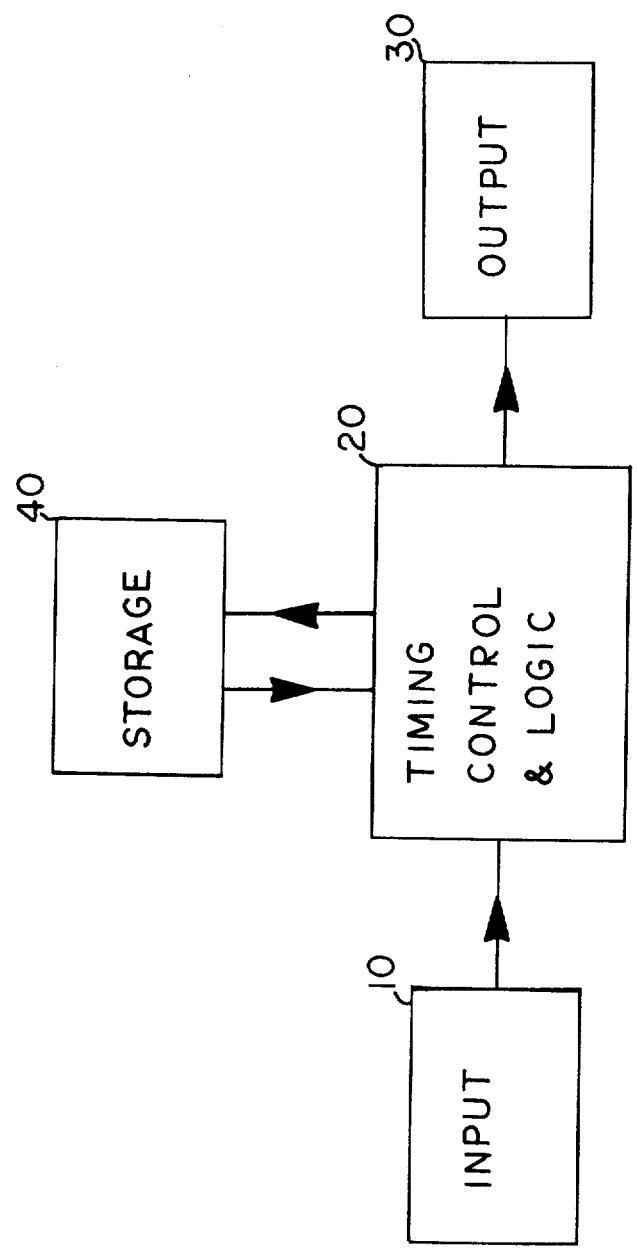
FIG. 1 is a block diagram of the Automated Information Input, Storage and Retrieval System.

The Automated Information Input, Storage & Retrieval System of this invention is essentially a narrative information retrieval system. As shown in FIG. 1, the SWIFT-ANSWER system of this invention which is an acronym for Special Word Indexed Full Text Alpha Numeric Storage With Easy Retrieval comprises an input device (10), which is connected to a timing control and logic unit (20). An output device (30) is also connected to the timing control and logic unit (20), such that the input device (10) is capable of receiving intelligent information, and the output device (30) is capable of retrieving the same intelligent, free-form, narrative information, under an appropriate strobing signal from the timing control and logic unit (20).

Figure 2:
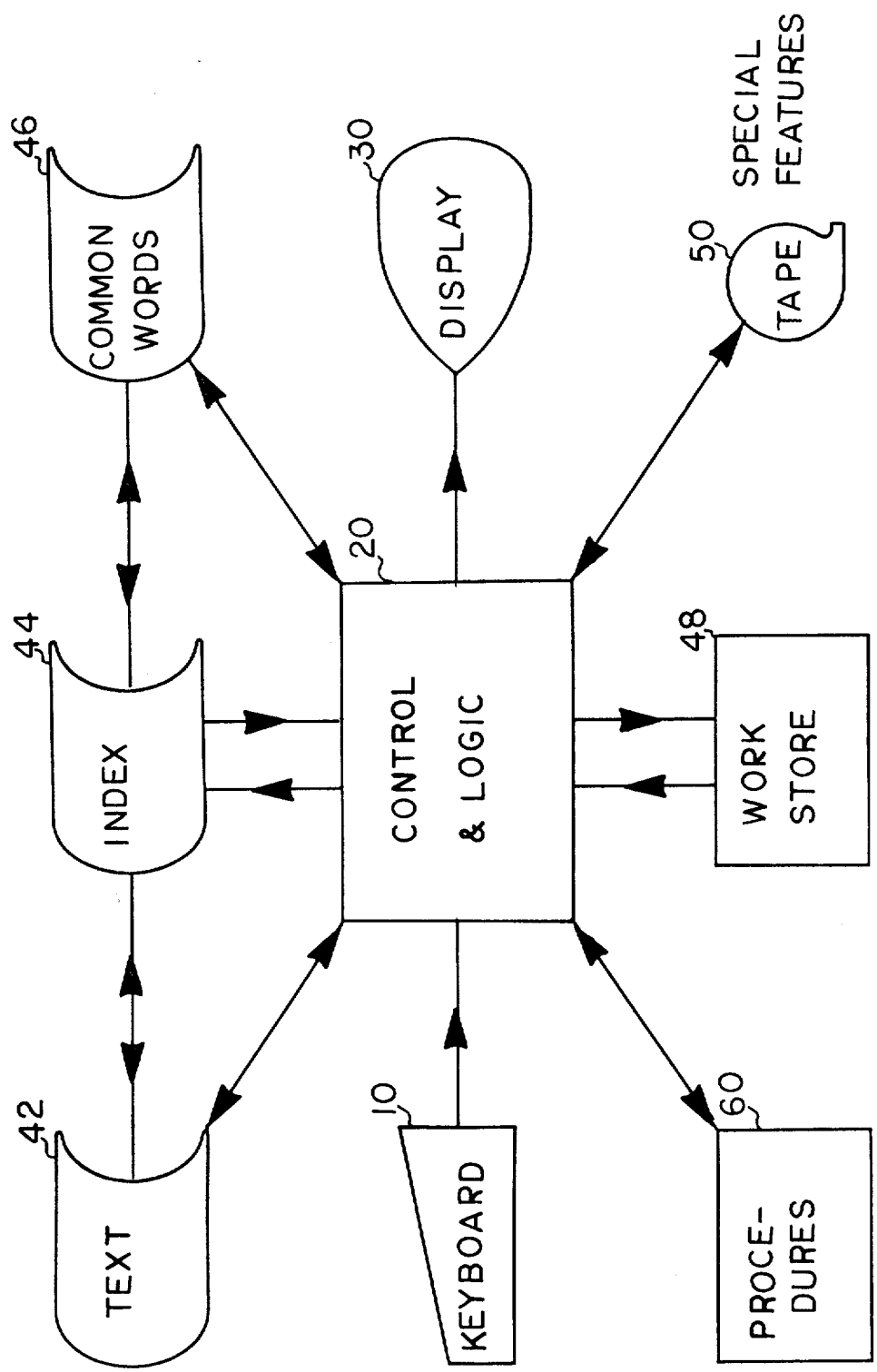
FIG. 2 is a configuration of the preferred embodiment of the Automated Information Input, Storage and Retrieval System of this invention.

Also connected to the timing control and logic unit (20) are several types of storage devices (40) capable of retaining intelligent, free-form, narrative information in English with full punctuation. These storage units as shown in FIG. 2, include but are not limited to, a unit for text storage (42), a unit for index and cross-reference information storage (44), a unit for common words storage (46), a working storage unit (48), a special features storage unit (50) for storing such information as 'searchonyms directory' and a procedures storage unit (60) for storing input procedures, output procedures, control procedures, logic procedures, and procedures for managing in-house information and handling special features.

All these said storage devices to wit; text storage (42), common words storage (46), index storage (44), working storage (48), special features storage (50) and procedures storage (60) are connected to the timing control and logic unit (20) such that each storage is capable of transferring information to and from every other unit, individually or collectively, under appropriate command signals from the timing control and logic unit (20).

Alternatively said storage devices may be separate sections partitioned within a larger storage unit (40) as shown in FIG. 1.

The input device (10) is also capable of receiving intelligent narrative infromation and storing it on the storage unit (40), under synchronization signal of the timing control & logic unit (20). Likewise, the output unit (30) is also capable of receiving information already stored on the storage unit (40), and holding it 'on-display' for the researcher, under the control of the timing control and logic unit (20), or under the control of the researcher.

Examples of the input device (10), are a cathode ray tube, a transducer, a voice digitizer, typewriter, teletypewriter, card reader, computer console, optical character reader, magnetic ink character reader and microfilm scanner reader etc.

Timing control and logic unit (20) can be any general purpose electronic digital computer, for example, International Business Machine System 370, Control Data Corporation Cybernetic series, N.C.R. Century series, Univac 1100 series, Honeywell series of computers, P.D.P. series of computers or equivalents thereof or their corresponding timing control and logic units, available readily under such trade names as mentioned above.

Examples of the output device (30), are automatic typewriter tele-typewriter, a line printer, a pen, an 'X-Y' plotter, a card punch with interpreter, cathode ray tube, computer output on microfilm, audio response unit, etc. In addition a card or paper tape punch without interpreter, or a magnetic tape or disc drive unit may be used as an output device, where the output is to be used by another machine or computer before finally being used by the researcher of the information.

Likewise just a few examples of the storage device (40) are; cards, paper tape, notebooks, magnetic tapes, magnetic discs, punched cards, microfilm, or any other device capable of retaining intelligent audio or written information for substantial lengths of time.

A configuration of the preferred embodiment of the Automated Information Input, Storage and Retrieval System with the following specific devices is shown in FIG. 2. A key-board as input device (10), a general purpose electronic digital computer as timing control and logic unit (20), a cathode ray tube as an output device (30), 3 magnetic discs storage units for text storage (42), cross-reference index storage (44), and common words storage (46) and two magnetic core storage units for use as working storage (48), and procedures storage (60), and a magnetic tape unit for special features storage (50) for example for storing searchonym directory.

Figure 3:
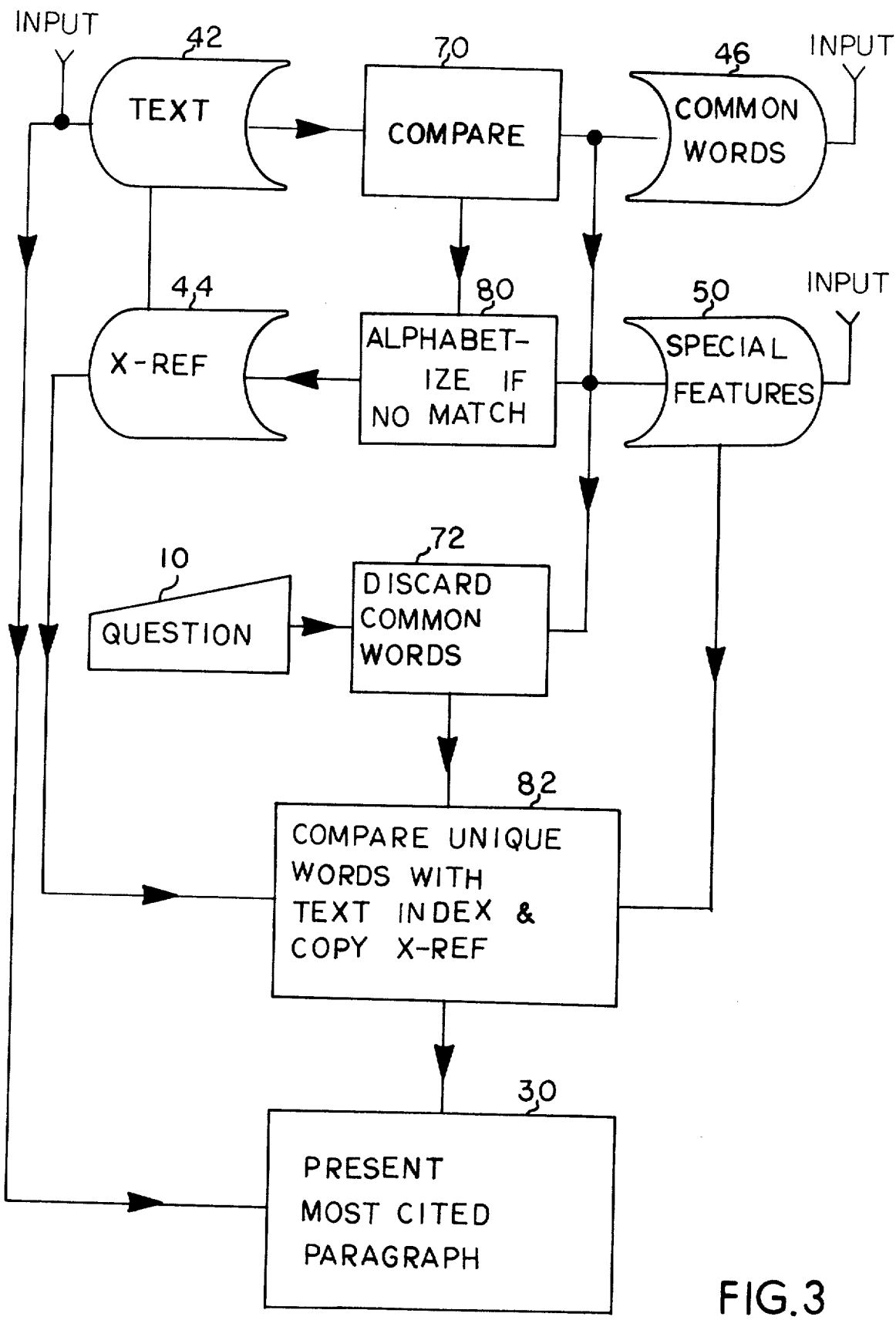
FIG. 3 is a system flow diagram of the Automated Information Input, Storage and Retrieval System of this invention.
Figure 4:
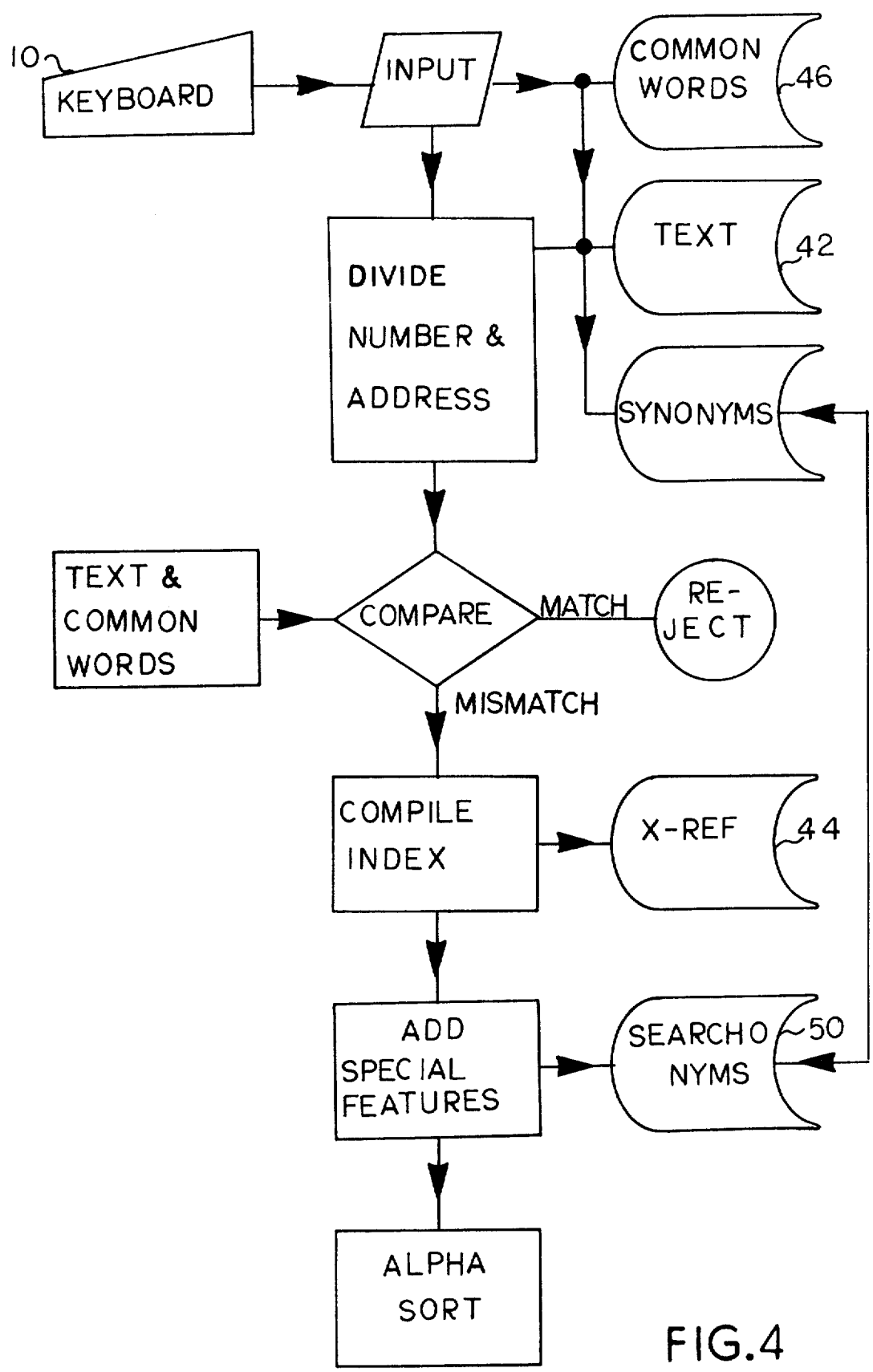
FIG. 4 is a logic and process flow diagram of the Automated Information Input, Storage and Retrieval System.
Figure 6:
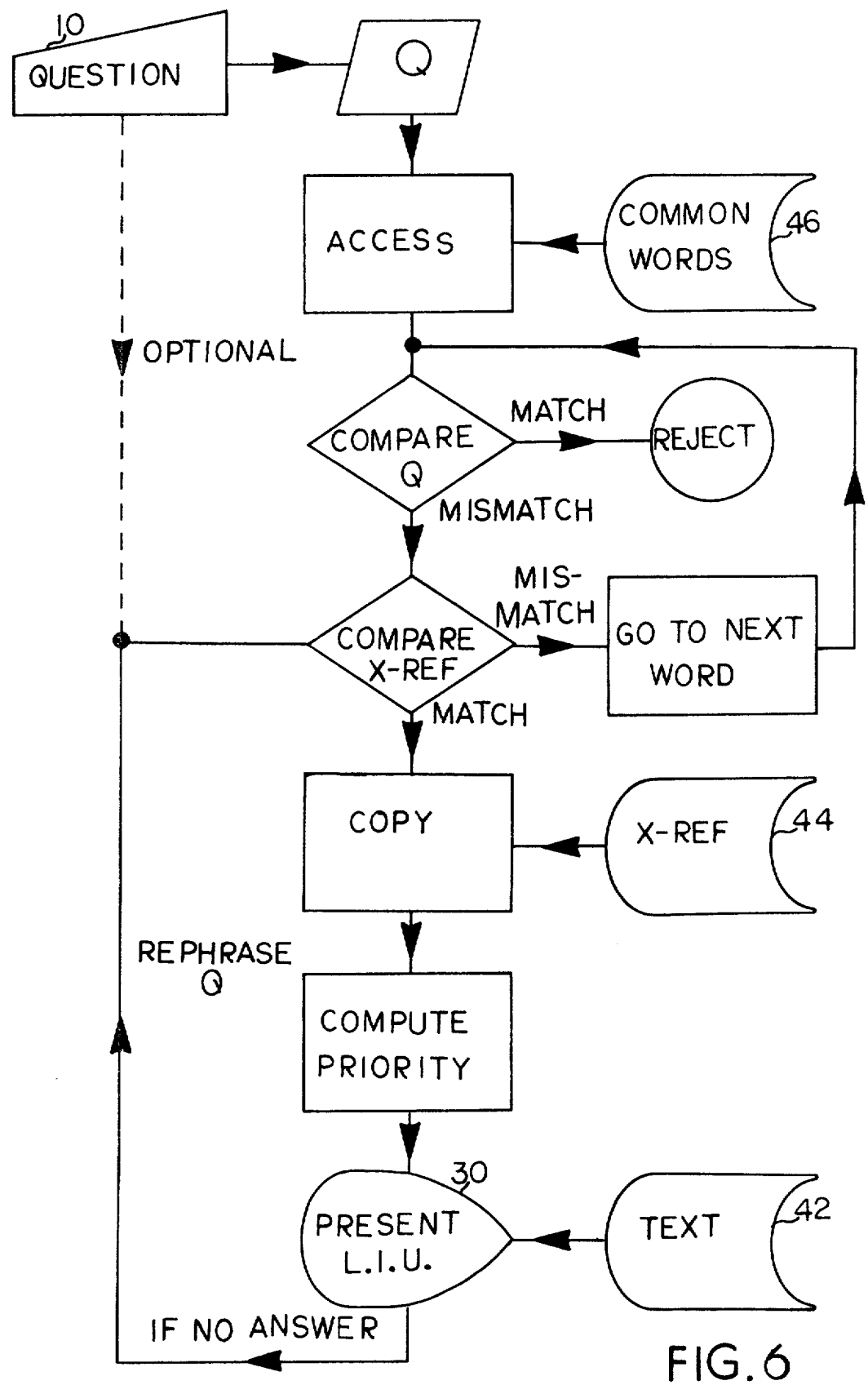
FIG. 6 is a logic and process flow diagram of the Output Subsystem of the Automated Information Input, Storage and Retrieval System.

The procedures storage unit (60) is further detailed in FIG. 3, vis-a-vis its relationship to input device (10), text storage unit (42), cross-reference index storage (44), common words storage (46) and output device (30). The procedure for inputting the intellignet narrative information into the Automated Information Input, Storage and Retrieval System of this invention is shown in FIG. 4. Likewise the procedure for retrieving the information from the Automated Information Input, Storage and Retrieval System is shown in FIG. 6. The procedures for the timing control and logic unit are standard procedures used in general purpose electronic digital computers and are commonly available from most computer manufacturers as well as soft-ware houses.

Searchonyms stored on a special features unit (50) are distinguisable from the synonyms. Whereas synonyms have the same meaning when standing alone as well as in a particular context of information, searchonyms do not necessarily have the same meaning when standing alone as individual words or phrases, but have the same meaning in a given narrative composition as shown in table-2 infra. Likewise a Phononyms directory of words with the same or similar sounds with the same or different meanings may be compiled and stored in the special features unit (50).

Figure 7:
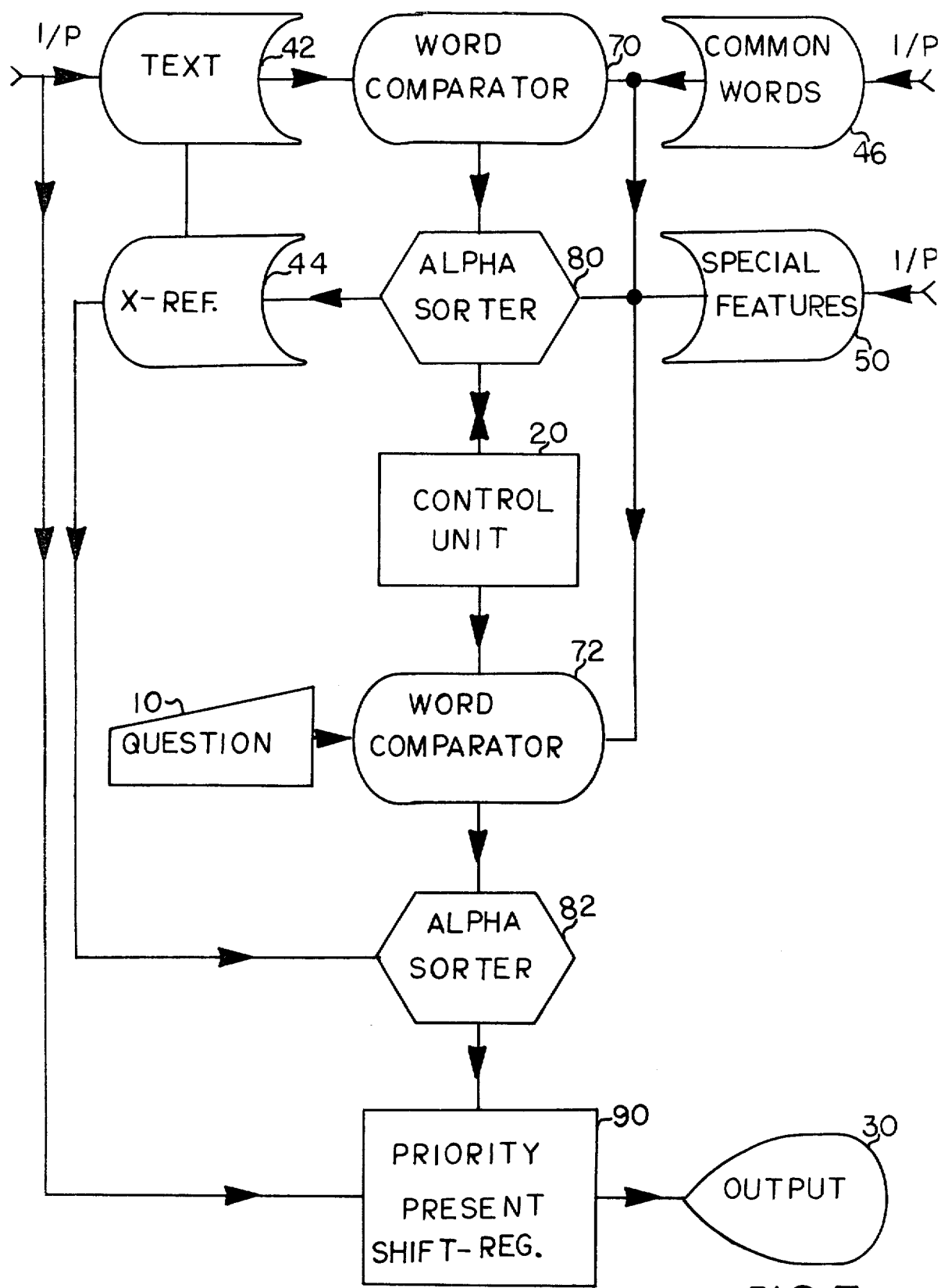
FIG. 7 is another embodiment of the Automated Information Input, Storage and Retrieval System of this invention.

Another embodiment of the Automated Information Input, Storage and Retrieval system of this invention is shown in FIG. 7, which comprises; a text storage unit (42), a common words storage unit (46), a comparator (70) connected between the text storage unit (42) and the common words storage unit (46) such that the combination is capable of performing a comparison between each word of the text against each of the common words, stored in their respective units upon command signal from the control unit (20). A sorter (80) is connected to said comparator (70) at its output end. The cross reference information storage unit (44) is connected between the text storage unit (42) and the sorter (80). The control unit (20) is connected to the text storage unit (42), the common words storage unit (46), the sorter (70), the cross-reference information storage unit (44), and the special features storage unit (50) via the sorter (80). Furthermore a second comparator (72) is connected to the control unit (20), the comparator (70) and the common words storage unit (46). The input device (10) in turn is connected to said second comparator (72). Similarly a second sorter (82) is connected between the second comparator (72) and the cross reference information storage unit (44), such that the combination is capable of matching and sorting words from the researcher's question against the words storage in the cross-reference information storage unit (44).

A plurality of shift registers (90) is connected to the text storage unit (42) and the second sorter (82) such that the shift registers (90) are able to fetch any portion of the text stored in the text storage unit (42), and present it for display to the output device (30).

OPERATION

For the sake of ease of understanding, the discussion of operation has been divided into two procedures viz. information Input Procedure and Information Output Procedure.

INPUT PROCEDURE

Figure 5:
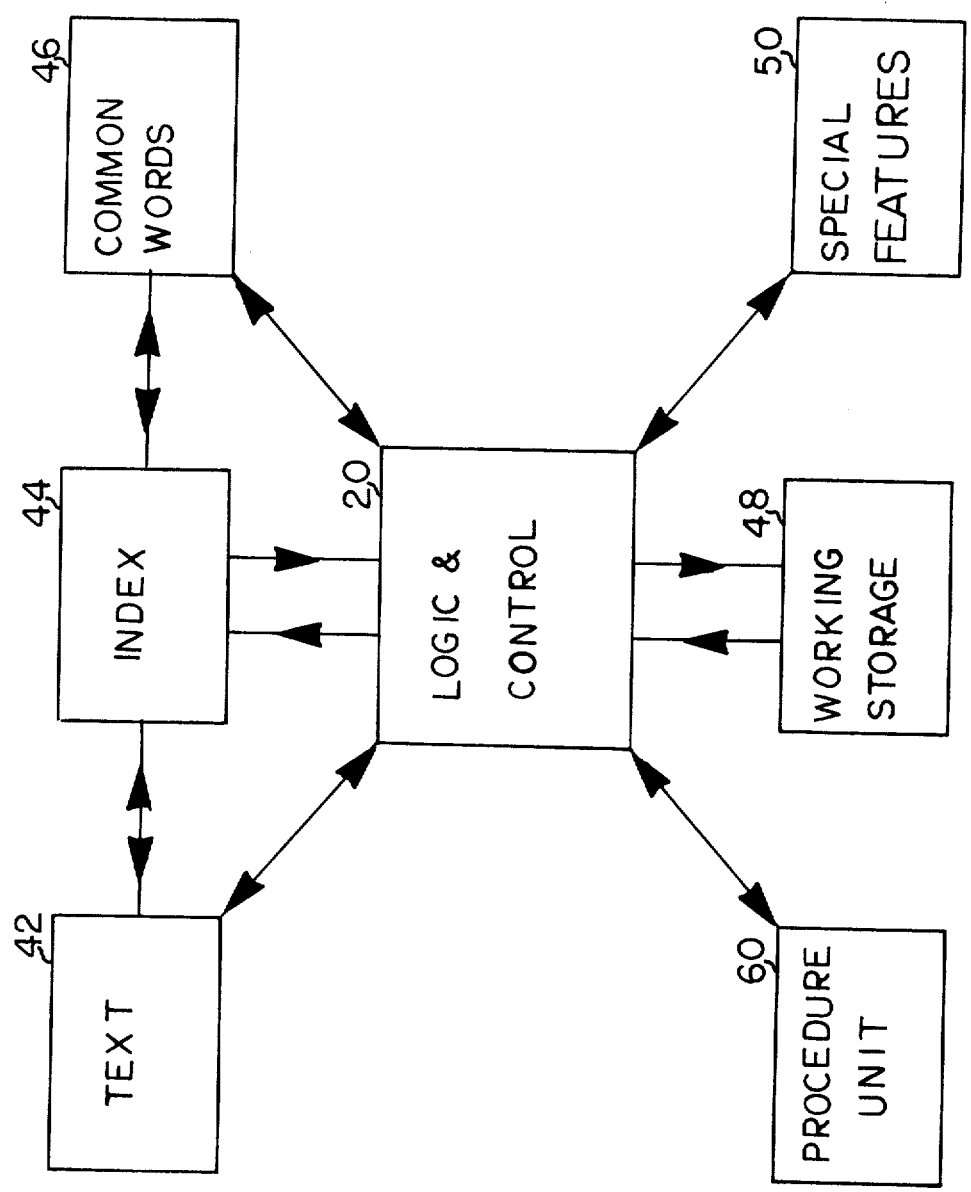
FIG. 5 is a block diagram of the storage subsystem of the Automated Information Input, Storage and Retrieval System.

FIG. 4 shows the logic and process flow diagram for inputting narrative information anew on the Automated Information Input, Storage and Retrieval System of this invention as related to the preferred embodiment of FIG. 5. Slight modifications will be necessary in the procedure if a configuration other than that shown in FIG. 5 is selected. Essentially the procedure comprises the following processing steps.

(a) Inputting the common words from table-1, using an appropriate input device (10), such that these words, via the timing control and logic unit (20) are transferred to the storage unit (46).

(b) Inputting the text of the information, from which questions are to be asked later on, with full punctuation through the input device (10), to the text storage unit (42) under command signals from the timing control and logic unit (20).

(c) Dividing the stored textual information into logic units of information such as paragraphs, and assigning each unit a unique number, as well as a storage location number, as per table 4.

(d) Inputting the searchonyms directory as it relates to a particular text of information, via input device (10) and timing control and logic unit (20), for storage on the special features storage unit (50).

(e) Selecting the first word from the text storage unit (42) and bring it to working storage (48), along with all the common words of storage unit (46) via the timing control and logic unit (20) to the working storage (48).

(f) Comparing said first word of the text with each word of the common words, now stored in working storage (48), and discarding such word if there is a match or storing and saving the word in case of a mismatch beyond a preset criteria, stored in the procedures storage unit (60).

(g) Repeating step (f) supra until all words of text storage unit (42) have been similarly compared.

(h) Computing and storing the following information against each word saved in steps (f) and (g) as per tables 3 & 4.
  (i) Logical Information Unit number in which said word appears.
  (ii) Logical Information Unit Word Frequency Number, that is the number of times said word appears in said logical information unit.
  (iii) Text Word Frequency Number, that is the number of times said word appears in the full text.
  (iv) Spread Number, that is the number of different Logical Information Units, in which said word appears at least once.
  (v) Logical Information Unit Location Number, that is the storage position number by which said Logical Information Unit may be addressed and fetched.

(i) Adding the searchonyms to the index storage unit (44), alongwith the corresponding Logical Information Unit Numbers in which any word or phrase appears to which the searchonyms have the same meaning in that context.

(j) Alphabetizing the words saved in index storage unit (44) such that all the words are arranged rather like in a conventional dictionary. It is a directory of all the uncommon text words. This step is accomplished by using one of the various sort methods available for this purpose from computer manufacturers as well as software houses.

OUTPUT PROCEDURE

The procedure for retrieving the stored information from the Automated Information Input, Storage and Retrieval System is shown in FIG. 6 and essentially comprises the following processing steps.

(a) Framing a question which can be answered by the test stored in text storage unit (42) using the information input procedure as shown in FIG. 4.

(b) Inputting the question using input device (10) for storage on Storage unit (48).

(c) Comparing each word of the question with each word of the common words stored in (46) and rejecting the words that match and saving the words from the question that do not match to a pre-established criteria such as the following.
  (i) 100% match if the word is four characters or less.
  (ii) one character mismatch may be tolerated if the word is five to seven characters long.
  (iii) Two errors may be tolerated if the word is eight or more characters long.
  (iv) If a word does not match it may be shifted up to two characters left or right for words up to six characters long.
  (v) If a word does not match, it may be shifted up to four characters left or right if the word is 7 characters or longer.
  (vi) if a word does not match, any one character may be dropped at a time to retry the match if the word is five character or shorter. Likewise any two characters may be dropped at a time if the word is 6 characters or longer.

(d) Comparing each saved word of the question with each word of the directory of the text stored in Index Storage Unit (44), along with searchonyms, if any, of words saved from the question.

(e) Computing and or copying the following information against each saved word that matches upto the degree of a pre-established criteria.
  (i) Logical Information Unit Number in which said word appears.
  (ii) Logical Information Unit Word Frequency Number, that is the number of times said word appears in said logical information unit.
  (iii) Text Word Frequency Number, that is the number of times said word appears in full text.
  (iv) Spread Number, that is the number of different Logical Information Units, in which said word appears at least once.
  (v) Logical Information Unit Location Number, that is the storage position number by which said Logical Information Unit may be addressed and fetched.

(f) Calling Logical Information Units in descending order of frequency of citation established by the following priority criteria.
  (i) Logical Information Units incorporating maximum number of words saved from the question. A word appearing plurality of times in a logical information unit is to be counted as one citation for this purpose. Searchonyms are excluded, if the corresponding word has been counted.
  (ii) Among those logical information units which rank equal in step (i) Logical Information Unit most cited; that is the sum of the number of times any saved word from the question appears in that logical information unit. A word appearing plurality of times in a logical information unit must be counted plurally for establishing this part of the priority. Searchonyms must also be counted. This priority is computed by adding parenthetical numbers appearing after each Logical Information Unit Number of table-3 infra.
  (iii) Among those logical information units which rank equal in (i) and (ii) supra, Logical Information Unit containing words least cited, including citation in other logical information units, being indicative of rarity, uniqueness and importance of the word. It is the lowest sum of pre-hyphenated numbers appearing for example in table-5.
  (iv) Among those logical information units that rank equal in (i), (ii) and (iii), the logical information unit that contains most words equally least cited.
  (v) Among those logical information units which rank equal in (i) through (iv), logical information unit comprising greatest spread. Spread Number is the post hyphenated number appearing after the equal sign in tables 3 and 5 infra.

(vi) Among those logical information units that rank equal in (i) through (v), Logical Information Unit containing least number of mismatched words, irrespective of whether the words appear in the question or not, that is to say the shortest logical information unit takes precedence if all other things are equal.

(g) Reframing the question and repeating steps (b) through (f) in case of no response.

TABLE 1

SAMPLE COMMON WORDS

| AM | ON | HIS | FROM | WHAT | SHOULD |
|----|----|-----|------|------|--------|
| AN | OR | ITS | HAVE | WHEN | BECAUSE |
| AS | SO | NEW | INTO | WHOM | HOWEVER |
| AT | US | NOR | JAIL | WITH | HOWMANY |
| BE | WE | NOT | MUCH | MADE | HOWMUCH |
| BY | ALL | OLD | UNTO | MAKE | SUBJECT |
| DO | AND | OUR | SOME | COULD | THEREIN |
| HE | ANY | OUT | SUCH | THEIR | THEREOF |
| IF | ARE | SHE | THAN | THERE | THEREON |
| IN | BUT | WAS | THEM | THESE | THERETO |
| IS | DID | WHO | THEN | WHERE | WHETHER |
| IT | FOR | WHY | THEY | WHICH | DISPATCH |
| ME | HAD | YES | THIS | WOULD | PROPERTY |
| NA | HAS | ALSO | THUS | HAVING | PROVIDED |
| NO | HER | BEEN | VERY | HEREIN | THEREFORE |
| OF | HIM | DOES | WERE | OBJECT | THEREUPON |

TABLE 2

SYNONYM & SEARCHONYM DIRECTORY SECTION

| WORD | SYNONYM | SEARCHONYM | CONTEXT REFERENCE |
|------|---------|------------|-------------------|
| absent | away | — | — |
| away | — | absent | 022 |
| belly | stomach | — | — |
| bible | — | scriptures | 088 |
| binary | twofold | — | — |
| black | — | dark | 111 |
| boot | — | shoe | 033 |
| candid | frank | — | — |
| check | — | draft | 981 |
| double | binary | — | — |
| draft | check | — | — |
| foot | — | feet | 085 |
| hand carry | — | rush | 015 |
| zip | pin | pin | 542 |
| zygo | — | yoke | 333 |

TABLE 3

SAMPLE CROSS REFERENCE DIRECTORY FILE STRUCTURE

| CATCH | 007(3) = 14-4 | 013(1) | 128(3) | 599(7) |
|-------|---------|--------|--------|--------|
| CATCH-UP | 001(1) = 4-3 | 009(2) | 985(1) | |
| CATEGORY | 090(2) = 9-4 | 091(2) | 752(2) | 832(3) |
| CATFISH | 013(2) = 7-4 | 078(3) | 152(1) | 642(1) |
| CATHERINE | 007(3) 352(1) = 16-7 | 111(3) 353(1) | 148(3) 845(2) | 253(3) |
| CATHODE | 111(1) = 6-3 | 113(2) | 117(3) | |
| CAUCUS | 542(3) 4-2 | 611(1) | | |
| CAUSE | 115(1) 485(1) 813(1) = 10-10 | 182(1) 507(1) 995(1) | 251(1) 682(1) | 312(1) 712(1) |

TABLE 4

LOGICAL INFORMATION UNIT ADDRESS DIRECTORY

| LIU Number | Address |
|------------|---------|
| 001 | 0101 0001, 0000 0001 |
| 002 | 0101 0001, 0000 0010 |
| 003 | 0101 0001, 0000 0011 |
| 004 | 0101 0001, 0000 0100 |
| 005 | 0101 0001, 0000 0101 |
| 006 | 0101 0001, 0000 0110 |
| 007 | 0101 0001, 0000 0111 |
| 008 | 0101 0001, 0000 1000 |
| 009 | 0101 0001, 0000 1001 |
| 010 | 0101 0001, 0001 0000 |
| 011 | 0101 0001, 0001 0001 |
| 012 | 0101 0001, 0001 0010 |
| 013 | 0101 0001, 0001 0011 |
| 014 | 0101 0001, 0001 0100 |
| 015 | 0101 0001, 0001 0101 |
| 016 | 0101 0001, 0001 0110 |
| 017 | 0101 0001, 0001 0111 |
| 018 | 0101 0001, 0001 1000 |
| 019 | 0101 0001, 0001 1001 |
| 020 | 0101 0001, 0010 1010 |

Following is a sample file structure after saving, searching, comparing and matching of saved words from a question against the cross reference directory.

TABLE 5

| Quick | 13(8) = 17-4 | 17(1) | 18(5) | 25(3) | |
|-------|---------|-------|-------|-------|---|
| Brown | 03(2) = 14-5 | 17(2) | 18(2) | 21(3) | 42(5) |
| Fox | 03(2) = 14-5 | 16(2) | 17(2) | 22(3) | 42(5) |
| Jump | 17(3) = 8-3 | 18(2) | 19(3) | | |
| Lazy | 13(2) = 8-3 | 17(3) | 18(3) | | |
| Dog | 12(1) = 5-3 | 17(3) | 18(1) | | |

Following is a listing of the components used in the preferred embodiment along with their specification arranged in ascending order of the reference numerals.

10 = Input device for example a keyboard
20 = Control Unit
30 = Output device for example a Cathode Ray Tube
40 = Storage Unit
42 = Text Storage Unit
44 = Cross Reference Index Storage Unit
46 = Common Words Storage Unit
48 = Working Storage Unit for example a scratch pad memory
50 = Special Features Storage Unit
60 = Procedures Storage Unit
70 = Common Words/Text Comparator
72 = Common Words/Question Comparator
80 = Alpha Sorter I
82 = Alpha Sorter II
90 = Prioritizing Procedure

EXAMPLES AND EXPLANATIONS

In this section the operation and the use of the SWIFT-ANSWER system will be explained by a general system example followed by specific examples of the match criteria and the priority criteria. In order to understand these examples it is helpful to keep the following system and criteria objectives in mind. The main objective of the system as mentioned before is to facilitate retrieval of narrative textual information by making the system very forgiving of user's mistakes with respect to rules of programming, punctuation, syntax, grammar and spelling, etc. The main objective of the match criteria is to increase the probability of match between the words saved from the question and the words saved from the text in spite of the spelling errors of the questioner especially in cases when the system has failed to generate any answer without the use of the matching criteria. Similarly the main objective of the priority criteria is to rank plurality of answers such that the paragraph most likely to contain the answer to the user's question is presented first. A detailed understanding of the underlying purposes and mechanics of the match (or mismatch) criteria and the priority criteria will be facilitated by following examples and explanations. The consideration of the system example necessitates the creation of the following hypothetical data.

(a) Hypothetical text data base
(b) Hypothetical alphabetized list of common words
(c) Cross reference index dictionary
(d) Hypothetical questions

TEXT

The hypothetical textual data base of the SWIFT-ANSWER system example consists of 40 paragraphs or Logical Information Units as follows.

1 = The quick brown fox jumps right over the lazy dog.
2 = Engineers invented television to provide that some radio programmes are as bad as they sound.
3 = Dog is man's best friend.
4 = A dog wins friends and influences people without reading books.
5 = No woman is likely ever to be elected president because they never reach the required legal age.
6 = Politics is the most promising of all careers. Promises and more promises.
7 = A little boy was saying his bedtime prayers in a low voice, "I can't hear you dear", his mother said. "I wasn't talking to you" replied the boy.
8 = "What are you painting little girl". "I am painting God". "But nobody knows what God looks like". "They will when I get done".
9 = I love you.
10 = Whoever invents or discovers any new and useful process, machine, manufacture, or composition of matter, or any new and useful improvement thereof, may obtain a patent therefor, subject to the conditions and requirements of this title.
11 = A patent may not be obtained though the invention is not identically disclosed or described as set forth in section 102 of this title, if the differences between the subject matter sought to be patented and the prior art are such that the subject matter as a whole would have been obvious at the time the invention was made to a person having ordinary skill in the art to which said subject matter pertains. Patentability shall not be negatived by the manner in which the invention was made.
12 = The specification shall conclude with one or more claims particularly pointing out and distinctly claiming, the subject matter which the applicant regards as his invention.
13 = Applications for patents shall be kept in confidence by the patent office and no information concerning the same given without authority of the applicant or the owner unless necessary to carry out the provisions of any act of congress or in such special circumstances as may be determined by the commissioner.
14 = Patents may be granted to the assignee of the inventor of record in the patent office upon the application made and the specification sworn to by the inventor except as otherwise provided in this title.
15 = No reissued patent shall be granted enlarging the scope of the claims of the original patent unless applied for within two years from the grant of the original patent.
16 = I, Satya Pal Asija, pledge allegiance to the flag of the United States of America, and to the republic for which it stands, one nation under God, indivisible, with liberty and justice for all.
17 = And when ye shall receive these things, I would exhort you that ye would ask God, the eternal father, in the name of Christ, if these things are not true; and if ye shall ask with a sincere faith in Christ, he will manifest the truth of it unto you, by the power of the Holy Ghost.
18 = Any by the power of the Holy Ghost ye may know the truth of all things.
19 = The teacher's duty is to watch over the church always, and to teach and strengthen them; and see that there is no iniquity in the church, neither hardness with each other, neither lying, backbiting, nor evil speaking.
20 = For behold, ye do love money, and your substance, and your fine apparel, and the adorning of your churches, more than ye love the poor and the needy, the sick and the afflicted.
21 = Verily I say, men should be anxiously engaged in a good cause, and do many things of their own free will, and bring to pass much righteousness.
22 = And see that all these things are done in wisdom and order; for it is not requisite that a man should run faster than he has strength, and again, it is expedient that he should be diligent, that thereby he might win the prize; therefore, all things must be done in order.
23 = And now, he imparteth his words by angels unto men, yea, not only men but women also. Now this is not all; little children do have words given unto them many times which confound the wise and the learned.
24 = The basic resource of a nation is its people. Its strength can be no greater than the health and vitality of its population. Preventable sickness, disability and physical or mental incapacity are matters of both individual and national concern.
25 = The intangible inner form of slavery may best be defined as doing something contrary to one's own beliefs and convictions against one's free will under fear.
26 = Prayer carriers us half-way to God. Fasting brings us to the door of his palace, and alms-giving procures us admission.
27 = We are members of one great body, planted by nature in a mutual love, and fitted for a social life. We must consider that we were born for the good of the whole.
28 = There is no such thing as chance; and what seems to us the merest accident springs from the deepest source of destiny.
29 = Basically there are two types of computers: analog and digital. Unless otherwise stated, when people say computer, they mean electronic digital computer.
30 = Like human beings computers too have an invisible soul known as the software. All that can be touched with hand is called hardware. Tangible parts of a computer that can be easily altered are called firmware.

31 = Positive logic is one in which higher or more positive voltage represents binary one. Likewise negative logic is one in which higher or more positive voltage represents binary zero.

32 = When I first came to this country I used to mix my Us and Ws but now I do wery vell.

33 = In India I was raised as a Hindu but now I enjoy beef steaks. I figured it's the Indian cow that is sacred but not American.

34 = My wife is not a woman's libber. She is of the opinion, why try to be equal when you are superior.

35 = I am always content with what happens; for I know that what God chooses is better than what I choose.

36 = The country is both the philosopher's garden and his library, in which he reads and contemplates the power, wisdom, and goodness of God.

37 = Those in this world who have the courage to try and solve in their own lives new problems of life are the ones who raise society to greatness! Those who merely live according to rule do not advance society, they only carry it along.

38 = Throughout my life I have gained more from my critic friends that from my admirers, especially when the criticism was made in courteous and friendly language.

39 = Life would be dull and colourless but for the obstacles we have to overcome and the fights that we have to win.

40 = Diligence is the mother of good luck, and God gives all things to industry. Work while it is called today for you know not how much you may be hindered tomorrow. One today is worth two tomorrows; never leave that till tomorrow which you can do today.

COMMON WORDS

Any word which appears too frequently in a data base to be useful for search is regarded as a common word. List of common words is custom selected to suit a particular data base text. For example in patent office data base 'patent' will be treated as a common word but not in police data base. Following list of common words has been selected for the hypothetical text. This list is different from table 1 because certain common words mentioned in that list do not appear in the text of this example. Similarly additional common words which appear in the text of the hypothetical example have been added below. As contrasted from segmented alphabetical order of the table 1, the common words below are arranged in the cumulative alphabetical order.

| A | AMONG | AS |
|---|---|---|
| ABOVE | AN | AT |
| ALL | AND | BE |
| ALSO | ANY | BECAUSE |
| AM | ARE | BEEN |
| BELOW | HOWEVER | OK |
| BETWEEN | HOWMANY | ON |
| BUT | HOWMUCH | ONLY |
| BY | I | OR |
| CAN | IF | OUR |
| COULD | IN | OUT |
| DID | INTO | SAY |
| DO | IS | SHALL |
| DOES | IT | SHE |
| DONE | ITS | SHOULD |
| DOTH | LESS | SO |
| EITHER | MADE | SOME |
| EVER | MAKE | SUCH |

-continued

| FOR | MANY | THAN |
|---|---|---|
| FORTH | MAY | THAT |
| FROM | ME | THEIR |
| HAD | MIGHT | THEM |
| HAS | MORE | THEN |
| HAVE | MOST | THERE |
| HAVING | MUCH | THEREOF |
| HE | NEITHER | THEREFOR |
| HER | NEXT | THESE |
| HERE | NO | THEY |
| HEREIN | NOR | THIS |
| HIM | NOT | THO |
| HIS | NOW | THOSE |
| HOW | OF | THOUGH |
| THUS | WE | WHOM |
| TILL | WERE | WHY |
| TO | WHAT | WILL |
| UNDER | WHEN | WITH |
| UNLESS | WHERE | WOULD |
| UNTIL | WHETHER | YE |
| UNTO | WHICH | YEA |
| UPON | WHILE | YES |
| US | WHO | YOU |
| WAS | | |

X-REF

The cross reference index dictionary is compiled by comparing each word of the text against list of common words. If there is no match then the paragraph or L.I.U. (Logical Information Unit) in which that word appears is noted. If a word appears more than once within the same paragraph (or LIU) then the frequency is also noted within parenthesis. All such saved words are then arranged in alphabetical order. The size of the numerical information is directly proportional to the size of the text and is also a function of the nature of the text. Multiple paragraph nomenclature are separated by a hyphen (-). No parenthetical digit means that the word appears only once in that particular paragraph or logical information unit.

Accident = 28
According = 37
Act = 13
Admire = 38
Admission = 26
Adorn = 20
Advance = 37
Afflict = 20
Again = 22-25
Age = 5
Allegiance = 16
Along = 37
Alter = 30
Always = 19-35
Alms-giving = 26
America = 16-33
Analog = 29
Angel = 23
Anxious = 21
Apparel = 20
Applicant = 12-13(2)-14-15
Art = 11(2)
Asija = 16
Ask = 17(2)
Assign = 14
Author = 13
Backbiting = 19
Circumstance = 13
Claim = 12(2)-15
Colourless = 39
Commissioner = 13
Compose = 10
Computer = 29(3)-30(2)
Concern = 13-24

Bad = 2
Basic = 24-29
Bedtime = 7
Beef = 33
Behold = 20
Being = 30
Belief = 25
Best = 3
Better = 35
Binary = 31(2)
Body = 8-27
Books = 4
Born = 27
Both = 24-36
Boy = 7(2)
Bring = 21-26
Brown = 1
Call = 30-40
Came = 32
Careers = 6
Carry = 13-26-37
Cause = 21
Chance = 28
Child = 23
Choose = 35(2)
Christ = 17(2)
Church = 19(2)-20
Determine = 13
Difference = 11
Digit = 29(2)
Diligent = 22-40
Disability = 24
Discover = 10
Disclose = 11

-continued

| | | | |
|---|---|---|---|
| Conclude = 12 | Distinct = 12 | Patent = 10-11(3)-13(2)14(2)-15(3) | Raise = 33-37 |
| Condition = 10 | Dog = 1-3-4 | People = 4-24-29 | Reach = 5 |
| Confide = 13 | Door = 26 | Person = 11 | Reading = 4-36 |
| Confound = 23 | Dull = 39 | Pertain = 11 | Receive = 17 |
| Congress = 13 | Duty = 19 | Philosophers = 36 | Record = 14 |
| Consider = 27 | Each = 19 | Physical = 24 | Regard = 12 |
| Contemplate = 36 | Easily = 30 | Planted = 27 | Reissued = 15 |
| Content = 35 | Elected = 5 | Pledge = 16 | Reply = 7 |
| Contrary = 25 | Electronic = 29 | Politics = 6 | Represent = 31(2) |
| Convict = 25 | Engage = 21 | Poor = 20 | Republic = 16 |
| Country = 32-36 | Enjoy = 33 | Population = 24 | Required = 5-10 |
| Courage = 37 | Enlarging = 15 | Positive = 31(3) | Requisite = 22 |
| Courteous = 38 | Engineers = 2 | Power - 17-18-36 | Resource = 24 |
| Critic = 38(2) | Especially = 38 | Prayers - 7-26 | Right = 1 |
| Cow = 33 | Equal = 34 | President = 5 | Righteousness = 21 |
| Dear = 7 | Eternal = 17 | Preventable = 24 | Rule = 37 |
| Deep = 28 | Evil = 19 | Prior = 11 | Run = 22 |
| Define = 25 | Except = 14 | Prize = 22 | Sacred = 33 |
| Describe = 11 | Exhort = 17 | Problems = 37 | Same = 13 |
| Destiny = 28 | Expedient = 22 | Satya = 16 | Substance = 20 |
| Faith = 17 | Happen = 35 | Scope = 15 | Superior = 34 |
| Fast = 22-26 | Hardness = 19 | Section = 11 | Sworn = 14 |
| Father = 17 | Hardware = 30 | See = 19-22 | Talking = 7 |
| Fear = 25 | Health = 24 | Seems = 28 | Tangible = 30 |
| Fights = 39 | Hear = 7 | Set = 11 | Teach = 19(2) |
| Figure = 33 | High = 31(2) | Sick = 20-24 | Television = 2 |
| Fine = 20 | Hindered = 40 | Sincere = 17 | Throughout = 38 |
| Firmware = 30 | Hindu = 33 | Skill = 11 | Thing = 17(2)-18-21-22(2)-28-40 |
| First = 32 | Holy = 17-18 | | Time = 11-23 |
| Fit = 27 | Human = 30 | Slavery = 25 | Title = 10-11 |
| Flag = 16 | Identical = 11 | Social = 27 | Today = 40(3) |
| Form = 25 | Impart = 23 | Society = 37(2) | Touch = 30 |
| Fox = 1 | Improve = 10 | Software = 30 | True = 17(2)-18 |
| Free = 21-25 | Incapacity = 24 | Solve = 37 | Try = 34-37 |
| Friend = 3-38(2) | India = 33 | Sought = 11 | Type = 29 |
| Garden = 36 | Individual = 24 | Soul = 30 | Two = 15-40 |
| Gained = 38 | Indivisible = 16 | Sound = 2 | United = 16 |
| Get = 8 | Industry = 40 | Source = 28 | Use = 10(2)-32 |
| Ghost = 17-18 | Influence = 4 | Speaking = 19 | Veil = 32 |
| Girl = 8 | Inform = 13 | Special = 13 | Verily = 21 |
| Given = 18-23-40 | Iniquity = 19 | Specification = 12-14 | Vitality = 24 |
| God = 8(2)-16-17-26-35-36-40 | Inner = 25 | Springs = 28 | Voice = 7 |
| Good = 21-27-36-40 | Intangible = 25 | Stands = 16 | Voltage = 31(2) |
| Grant = 14-15(2) | Invented = 2-10-11(3)-14(2) | States = 16-29 | V's = 32 |
| Great = 24-27-37 | Invisible = 30 | Steaks = 33 | Watch = 19 |
| Half-way = 26 | Jumps = 1 | Strength = 19-22-24 | Wery = 32 |
| Hand = 30 | Justice = 16 | Subject = 10-11(3)-12 | World = 37 |
| Kept = 13 | Mean = 29 | Whole = 11-27 | W's = 32 |
| Knows = 8-18-30-35-40 | Member = 27 | Wife = 34 | Work = 40 |
| Language = 38 | Men - 21-23(2) | Will = 21-25 | Worth = 40 |
| Lazy = 1 | Mental = 24 | Wins = 4-22-39 | Year = 15 |
| Learn = 23 | Merest = 28-37 | Wisdom = 22-23-36 | Zero = 31 |
| Leave = 40 | Mix = 32 | Woman = 5-23 | 102 = 11 |
| Legal = 5 | Money = 20 | Words = 23(2) | |
| Libber = 34 | Mother = 7-40 | | |
| Liberty - 16 | Mutual = 27 | | |
| Library = 36 | Name = 17 | | |
| Life = 27-37-38-39 | Nation = 16-24(2) | | |
| Likely = 5-8-30 | Nature = 27 | | |
| Likewise = 31 | Necessary = 13 | | |
| Little = 7-8-23 | Needy = 20 | | |
| Lives = 37(2) | Negative = 11-31 | | |
| Logic = 31(2) | Never = 5-40 | | |
| Looks = 8 | New = 10(2)-37 | | |
| Love = 9-20(2)-27 | Obstacles = 39 | | |
| Low = 7 | Obtain = 10-11 | | |
| Luck = 40 | Obvious = 11 | | |
| Lying = 19 | Office = 13-14 | | |
| Machine = 10 | One = 31(2)-37-40 | | |
| Mans = 3-22 | Opinion = 34 | | |
| Manifest | Order = 22(2) | | |
| Manner = 11 | Ordinary = 11 | | |
| Manufacture = 10 | Original - 15(2) | | |
| Matter = 10-11(3)-12-24 | Otherwise - 14-29 | | |
| Overcome = 39 | Process = 10 | | |
| Owner = 13-21-25-37 | Procures = 26 | | |
| Painting = 8(2) | Programmes = 2 | | |
| Pal = 16 | Promise = 6(4) | | |
| Palace = 26 | Prove = 2 | | |
| Particular = 12 | Provide = 13-14 | | |
| Parts = 30 | Quick = 1 | | |
| Pass = 21 | Radio = 2 | | |

QUESTIONS

The use of the SWIFT-ANSWER system is explored by considering the following five hypothetical questions for which answers exist in the hypothetical textual data base.

(1) Is dog best friend of man?
(2) May the inventor of an improvement get a patent on his or her improvement?
(3) Are cows sacred in India?
(4) What does section 102 of the patent laws say?
(5) Do you love me?

It should be noted that these are merely hypothetical questions and may be varied considerably without noticeable sacrifice in the quality of answers. Furthermore for the purposes of comparison no distinction is made between upper and lower case characters, even though answers will be presented in proper upper and lower case.

QUESTION 1=IS DOG BEST FRIEND OF THE MAN?

Common words=Is, Of, The
Saved Words=Dog, man, best, friend

Applying the cross reference index information against the saved words in alphabetical order creates the following:
BEST=3
DOG=1, 3, 4
FRIEND=3, 38(2)
MAN=3, 22

It may be noted that the matching criteria has permitted a match between man and man's even though there is not a 100% match.

Arranging the logical information units according to the priority criteria gives the following order in which the paragraphs will be presented to the questioner.
3, 38, 4, 1, 22

QUESTION 2=May the inventor of an improvement get a patent on his improvement?
Common words=May, the, of, an, get, a, on, his
Saved words=Inventor, improvement, patent Copying cross reference index information against saved words in alphabetical order creates the following:
Improvement=10
Inventor=2, 10, 11(3), 14(2)
Patent=10, 11(3), 13(2), 14(2), 15(3)

Arranging the logical information units according to the priority criteria gives the order in which the paragraphs will be presented to the user as follows:
10, 11, 14

10=Whoever invents or discovers any new or useful process . . . or useful improvement thereof may obtain a patent therefor. As is apparent from reading paragraph 10, it contains the answer to the question and therefore paragraphs 11 and 14 will not be presented to the user.

QUESTION 3=Are cows sacred in India?
Common words=Are, in
Saved words=Cows, sacred, India Applying the cross reference index information against the saved words in alphabetical order creates the following:
Cows=33
India=33
Sacred=33

Since only one paragraph is cited in the above reference, there is no need to execute the priotizing step.

It becomes apparent from reading the paragraph 33 that it contains the answer to the question as follows.
33=In India I was raised as a Hindu, but now I enjoy beef steaks. I figured it is the Indian cow that is sacred, not American.

QUESTION 4=What does section 102 of the patent laws say?
Common words=What, does, of, say
Saved words=Section, 102, patent, laws
Copying the cross reference index information against the saved words arranged in alphabetical order creates the following:
102=11
Patent=10, 11(3), 13(2), 14(2), 15(3)
Section=11

Arranging the logical information units (paragraphs in this case) according to the priority criteria gives the following order in which the paragraphs will be presented to the user.
11, 15, 14, 13, 10

Since the paragraph 11 contains the correct answer to the question, most probably the questioner will not elect to examine the subsequent paragraphs.

11="A person shall be entitled to a patent unless . . . ".

QUESTION 5=Do you love me?
Common words=Do, you, me
Saves word=Love
Copying cross reference information against the saved words one gets. LOVE=9, 20(2), 27

Applying the priority criteria the paragraphs will be presented as follows:
20, 9, 27

MATCHING CRITERIA

The main objective of the matching criteria is to treat a word from the question congruant to a word from the text even when they are not exactly equal in number and order of characters.

In most instances the criteria is neither necessary nor used. The criteria is used primarily when matching words in text with words in question and secondarily when matching words of text or question with the list of common words. One purpose of the criteria is to be forgiving of questioner's spelling mistakes and user's typographical errors.

Another purpose of the criteria is to generate a match between a root word or stem & its derivative word. As for an example the use of the matching criteria will treat, manipulate, manipulative, manipulation, manipulator, manipulating, unmanipulate, etc. as matching words when one of these words is in the text and the other in the question.

Another purpose of relaxation of the criteria is to increase the possibility of some answer (even if wrong answer) if the first few tries fail to generate any answer. This is based on the premise that the questioner rather have a marginally relevant paragraph presented to him or her rather than repeatedly no answer at all. In the final analysis it is the questioner who decides whether or not the information presented by the system answers the question of the user.

The matching criteria disclosed by the applicant in the output procedure may be restated in its complement form as a mismatch criteria as follows.

(i) less than 100% match if the word is four characters or shorter,
(ii) more than one character mismatch for words between 5 and 7 characters in length,
(iii) more than two errors for words of 8 characters or longer,
(iv) if the word requires more than two characters shift lift or right from the middle character for words up to 6 characters long,
(v) if the word requires more than 4 characters shift left or right if the word is 7 characters or longer,
(vi) retry requires dropping more than one character for words up to five characters in length,
(vii) retry requires dropping more than two characters for six characters or longer words;

In a particular application whether matching criteria is used or mismatch criteria the result is the same just as rejecting less than 5' and 'accepting more than 4' are same or a glass half empty is also half full.

The matching criteria disclosed by the applicant is only an example of a criteria. Just as common words are selected to suit a particular text, criteria must also be modified to suit the needs of a particular application. In those instances where the questioners are highly educated, the criteria (relaxation) may not be necessary at all. In any event the system will first attempt to generate an answer without relaxing the criteria (ie, 100% match is required) because it is expedient to do so.

More words are matched by using the match (or mismatch) criteria than without it. If the matching is against common words more words may be rejected. If the matching is between saved words from the question and saved words from the text, then the rejection of words does not apply with or without the match criteria. More words will be matched and hence more cross reference information will be copied thereby increasing the possibility of an answer. In other words whether the use of relaxation of the match criteria will decrease or increase the number of words rejected depends upon whether the comparison is being made with common words or between saved words. Since relaxation of the criteria enables more words to be matched, when the words from the question or text or compared with the list of common words, fewer words will be saved. But this use in actual practice is not envisioned since the common words and the text should not contain spelling mistakes. Particularly when the text words have been precompared and verified. The criteria is more likely to be used when the question words are matched with common words such that fewer words are saved and therefore mistakes in spelling are resolved in favor of the questioner. The real use of the criteria comes into play when saved words from the question or matched against saved words of the text. Under these circumstances words mispelled by the questioner in the question will be declared by the system as matching with correct spellings of the word in the text. Relatively little harm is done by misspelling common words on a question but to compensate for spelling errors in uncommon words of the question, the matching criteria is very useful. Spelling error of a common word merely delays response time but does not diminish the quality or accuracy of answer. This is because of misspelled common word is not likely to be found in the cross reference directory to affect the answer one way or the other.

Errors as used in the matching criteria refers to spelling errors which have resulted in mismatch. Comparing 'LOVE' and 'LIVE' would be labelled as having one error. Since 100% match is required for words up to four characters in length the two words will be declared as mismatched. An example of two errors would be 'MULTIPLY' and 'MOLTIPLI'.

Shifting is necessary to increase match between words saved from a question versus words saved from the text. This is necessitated not only by spelling errors of the questioner, but also because many words have prefixes and suffixes. With shifting 'UNMANIPULATE' and 'MANIPULATION' will be declared as matching words even though there is not a 100% match. Shifting is used only when more than specified number of characters mismatch for words of that length as specified in the matching criteria.

Dropping a character like shifting increases the probability of match between two words. Generally shifting and dropping a character work in concert. Dropping a character in this context means ignoring a character for the purposes of the match. For example if the user spells 'UNTILL' instead of 'UNTIL' then dropping second 'L' would result in a match but this is seldom necessary because 'UNTIL' is a common word and the main advantage of the dropping accrues when comparing saved words from the question against saved words from the text. As another example if the questioner spells 'MASSACHUSSETTSS' then dropping the second 'S' at the end will result in a match. A character is never dropped from a saved word in the text but merely from a saved word in the question and that too temporarily. In the above examples a character at the end was dropped, but in actual practice any character may be dropped.

PRIORITY CRITERIA

The main purpose of the priority criteria is that the system present that paragraph to the user first which is most likely to contain the answer to his/her question. In other words when plurality of logical information units (paragraphs) contain plurality of saved words from the question then the system will present to the user paragraphs in descending order of likelihood of answer to the question. The most likely paragraph with maximum match of saved words from question with saved words of the text dictionary will be presented first and least likely at the end should there be a need. Another purpose of the priority criteria is to avoid overburdening the user with the excessive information. The priority criteria disclosed by the applicant is merely one example. Variations in the criteria must be made to suit a particular application. Like matching criteria the priority criteria is also used only when necessary; to wit when plurality of paragraphs apparently contain the answer to the user's question. Naturally priority criteria is not used when the system generates no answer or only one answer.

The priority criteria can be better understood by analyzing its application to questions 1 through 5 supra. In question 1 for example, paragraph 38 took precedence over all other paragraphs because a word from the question appears twice in the paragraph 38 but no word from the question appears more than once in other paragraphs. Similarly paragraphs 4 and 1 take precedence over 22 because of the length (vii) and spread (v) aspect of the priority criteria spura. Just as in question 1 paragraph 3 is the only logical information unit which contains all of the saved words from the question, so does paragraph 10 contain all of the saved words from the question 2. Question 3 generates only one paragraph and therefore the possibility of applying the priority criteria does not arise. In question 4 '102' is treated as a word and matched accordingly. In question 5 paragraph 20 takes precedence over paragraphs 9 and 27 because of frequency and paragraph 9 takes precedence over 27 because of size. As in example questions 1 through 5, the priority criteria is rarely used completely. Generally the paragraphs cited by saved words in the question can be prioritized without exhausting the priority criteria. Just as in matching criteria, sequence is important in priority criteria as well. As for example one may not apply (n+1)th segment of the criteria unless two or more paragraphs rank equal in the application of the nth segment of the priority criteria. Like matching criteria priority criteria disclosed by the applicant has seven segments.

The applicant has deliberately included a text with 40 paragraphs so that a reader may practice the teaching of this invention by generating his/her own hypothetical questions. Above examples by necessity have been specific and limited in scope. They should not be interpreted as limiting the scope or the spirit of the SWIFT-ANSWER invention. In actual practice many modifications may be made without deviating from the spirit of this invention. As for example during comparisons hyphens (-) may be treated as spaces or words may also be compared with synonyms and antonyms to increase the probability of the right answer first time if one exists at all, or the absolute matching criteria may be replaced by some kind of a percentage matching criteria. It is further envisioned that with the progress of technology newer components as they become available will be used in conjunction with this teaching. As for example comparisons may be made phonetically when voice recognition systems become a common and accurate means of man machine communication.

I claim:

1. A process for information input using electromechanical devices, storage, search and output comprising the steps of:
   (a) inputting textual information with full punctuation to a storage device;
   (b) dividing the text into logical information units;
   (c) assigning each logical unit of information a unique Logical Information Unit Number;
   (d) assigning a unique storage address to each logical information unit;
   (e) inputting plurality of common words such as, "I, we, you, he, she, it, as, an, at, am, are, was, is, on, in, upon, who, where, which, when, why,";
   (f) arranging the common words in alphabetical order;
   (g) establishing a match criteria;
   (h) comparing each word from the text against each common word character by character;
   (i) saving the word from the text at a separate location in case of a mismatch beyond the match criteria established in step (g) supra;
   (j) arranging the saved words in alphabetical order;
   (k) compiling & storing general purpose synonym directory in alphabetical order;
   (l) compiling & storing special purpose searchonym directory with respect to the text stored in step (a) supra;
   (m) adding synonyms and searchonyms to the words saved in step (i) supra;
   (n) alphabetizing said saved words;
   (o) computing and storing search index information against each saved word of step (n) supra;
   (p) framing and inputting researcher's free-form narrative natural language non-preprogrammed question;
   (q) comparing each word of the question with each of the common words stored in step (e) supra;
   (r) saving the mismatched words from the question that do not satisfy the match criteria established in step (g) supra;
   (s) adding synonyms and searchonyms to the words saved from the user's question;
   (t) arranging the words saved from the question alongwith their synonyms and searchonyms in alphabetical order;
   (u) matching each word saved from the question including its synonym against each word saved from the text including its searchonym;
   (v) copying search index information of step (o) against each word that matches upto the match criteria of step (g);
   (w) establishing a priority criteria for calling logical information units to the attention of the researcher of the textual information;
   (x) presenting the logical information units to the researcher of the information in the order established in step (w) supra;
   (y) reframing the question and repeating steps (p) through (x) supra in case of unsatisfactory response; and
   (z) framing the next question and repeating steps (p) through (y) supra, in case of satisfactory response.

2. A process for information input, storage, search and output of claim 1, wherein the match criteria is characterized by the following:
   (a) complete match if the word is four character or shorter,
   (b) up to one character mismatch may be excused for words between 5 and 7 characters in length,
   (c) up to two character mismatch may be excused for words eight character or longer in length,
   (d) match by shifting two character positions left or right from the median for words up to 6 characters in length, satisfies the match criteria,
   (e) match by shifting up to four character positions left or right from the median for words 7 characters or longer, likewise satisfies the match criteria,
   (f) retry requires dropping only one character for words up to 5 characters in length,
   (g) retry requires dropping up to two characters for words longer than 6 characters.

3. A process for information input, storage, search and output of claim 1 wherein search index information comprises the following information:
   (a) Logical Information Unit Number in which said word appears,
   (b) Logical Information Unit Word Frequency Number, that is the number of times said word appears in said logical information unit,
   (c) Text Word Frequency Number, that is the number of times said word appears in the full text,
   (d) Word Spread Number, that is the number of different logical information units, in which said word appears at least once,
   (e) Logical Information Unit Address, that is storage position number by which said information unit may be fetched, and
   (f) wherein said inputting step (a) is performed via a cathode ray tube said presenting step (x) is performed on an electric typewriter.

4. A process for information input, storage, search and output of claim 1 wherein said priority criteria is characterized by the following priority:
   (a) logical information unit incorporating maximum number of words saved from the question,
   (b) logical information unit incorporating maximum number of synonyms and searchonyms to the words saved from the question,
   (c) logical information unit most cited,
   (d) logical information unit containing word least cited,
   (e) logical information unit that comprises maximum number of words equally least cited,
   (f) logical information unit containing word with highest spread,
   (g) logical information unit with highest spread number,
   (h) logical information unit containing least number of mismatched words,
   (i) shortest logical information unit with least words.

5. A process for information input, storage, search and output of claim 1, wherein said searchonym directory includes those synonyms and words, which have same meaning in a given context in the text and excludes those synonyms which do not have same meaning in the text.

6. A process for textual information input and storage comprising the following processing steps:
  (a) inputting textual information with complete punctuation to a storage device via an input device;
  (b) dividing the text into logical information units;
  (c) assigning each logical information unit a unique Logical Information Unit Number;
  (d) assigning a unique storage address to each logical information unit;
  (e) compiling and storing a general purpose synonym directory in alphabetical order;
  (f) compiling and storing a special purpose searchonym directory with respect to the text stored in step (a) supra;
  (g) inputting plurality of common words such as, "I, AS, AN, AT, AM, IS, IT, ON, IN, WE, YOU, WHO, WHERE, WHICH, WHY";
  (h) arranging the common words in alphabetical order;
  (i) establishing a match criteria such as the following;
    (i) one hundred percent match if the word is four characters or less,
    (ii) one character mismatch may be excused if the word is five to seven characters long,
    (iii) up to two character mismatch may be excused, if the word is 8 or more characters long,
    (iv) if a word does not match, it may be shifted up to two characters left or right from the median for words up to six characters in length,
    (v) a word may be shifted up to four characters left or right if the word is 7 characters or longer,
    (vi) any one character may be dropped for retry of words up to five characters long,
    (vii) any two characters may be dropped for retry of words of six character or longer;
  (j) comparing each word of the text against each common word character by character;
  (k) saving the word from the text at a separate location in case of a mismatch beyond the match criteria established in step (i) supra;
  (l) adding synonyms and searchonyms to the saved words;
  (m) computing and storing following search index information against each saved word and corresponding synonym and searchonym;
    (i) Logical Information Unit Number in which said word appears,
    (ii) Logical Information Unit Word Frequency Number, that is the number of times said word appears in said logical information unit,
    (iii) Text Word Frequency Number, that is the number of times said word appears in the full text,
    (iv) Word Spread Number, that is the number of different logical information units in which said word appears at least once,
    (v) Logical Information Unit Address, that is the storage position number of which said logical information unit may be fetched;
  (n) alphabetizing said saved words from the text alongwith their synonyms and searchonyms and corresponding search index information.

7. A process for textual information retrieval comprising the following steps:
  (a) framing a free-form narrative natural language non-programmed question;
  (b) inputting the question;
  (c) accessing the prestored common words;
  (d) accessing a pre-stored match criteria;
  (e) comparing each word of the question with each of the common words;
  (f) rejecting the words from the question that satisfy the match criteria;
  (g) saving and storing the words from the question that do not satisfy the match criteria;
  (h) accessing synonym and searchonym directory;
  (i) adding synonyms and searchonyms to the words saved from the question;
  (j) comparing each saved word from the question against each of the pre-saved words from the text;
  (k) copying the following information against each word that matches;
    (i) Logical Information Unit Number,
    (ii) Logical Information Unit Word Frequency Number,
    (iii) Text Word Frequency Number,
    (iv) Word Spread Number,
    (v) Logical Information Unit Address;
  (l) establishing a priority of presenting information to the researcher such as the following;
    (i) logical information unit incorporating maximum number of words saved from the question,
    (ii) logical information unit most cited,
    (iii) logical information unit containing words least cited,
    (iv) logical information unit that comprises most words least cited,
    (v) logical information unit with highest spread,
    (vi) logical information unit containing least number of mismatched words,
    (vii) shortest logical information unit with least words;
  (m) presenting the logical information units in the order established along with the question to the researcher;
  (n) reframing the question and repeating steps (b) through (m) in case of no response; and
  (o) framing the next question and repeating steps (b) through (o) in case of satisfactory response.

8. A swift-answer process for textual information input, storage and output using electro-mechanical devices comprising:
  (a) inputting and storing the text with full punctuation;
  (b) inputting and storing common words for the language of the text;
  (c) comparing each word of the text with each common word;
  (d) alphabetizing if mismatch, otherwise rejecting without destroying text;
  (e) compiling word to text cross-reference directory;
  (f) framing and inputting a free-form narrative natural language non-preprogrammed question;
  (g) discarding common words from the question;
  (h) comparing remaining words with indexed cross reference text directory;
  (i) copying cross reference address information against each word that matches; and
  (j) presenting paragraphs of the text in descending order of their frequency of citation.

9. A Swift-Answer process of textual information input, storage and output using electromechanical devices of claim 8 wherein the comparison of words is performed phonetically and wherein the step (a) supra is performed via an analog transducer and the step (j) supra is performed on an audio response unit.

10. New use of a general purpose electronic digital computer of the type including:
   (a) a timing control and logic unit;
   (b) an input device connected to said timing control and logic unit such that it is capable of receiving full text, free-form alpha-numeric intelligent information;
   (c) an output device capable of presenting intelligent free-form full text alpha-numeric narrative information, at the command signal from the timing control and logic unit to which it is connected on line;
   (d) a storage device for storing free-form full text alpha-numeric narrative information connected to said timing control and logic unit;
   (e) a storage device for storing index and cross-reference information which is compiled in the form of a dictionary, and is capable of relating to said text storage device through the timing control and logic unit;
   (f) a storage device for storing certain common words such as, "He, she, it, they, is, am, are, as, at, if, on, upon, who, when, where, which, why, whose" which is connected to said timing control and logic unit;
   (g) a temporary working storage unit for interim information processing, and is connected to said timing control and logic unit;
   (h) a storage device for storing special features; and
   (i) a storage unit for storing procedures comprising procedures for information input, information output, information storage, information processing, information retrieval, logic control and timing procedural information, special features procedures and in-house information management procedures and is connected to said timing control and logic unit; and wherein said new use comprises the following program steps:
      (a) inputting the textual information with full punctuation to said text storage unit via said input device;
      (b) dividing the text into logical information units such as paragraphs, and assigning each logical information unit a unique assignment number and a unique location number;
      (c) inputting common words of the language of the text such as "I, we, you, he, she, it, they, them, as, an, at, in, on, upon, who, where, why";
      (d) arranging said common words in alphabetical order;
      (e) establishing a match criteria;
      (f) comparing said common words of step (c) supra character by character with each word of the text stored in step (a) supra;
      (g) saving the word at a separate location in case of a mismatch beyond the match criteria established in step (e) supra;
      (h) arranging the saved words in alphabetical order;
      (i) computing and storing the following information against each saved word in the index storage unit;
         (i) Logical Information Unit Number in which said word appears,
         (ii) Logical Information Unit Word Frequency Number, that is the number of times said word appears in said logical information unit;
         (iii) Text Word Frequency Number that is the number of times the word appears in the text,
         (iv) Word Spread Number, that is the total number of different logical information units in which said word appears at least once,
         (v) Logical Information Unit Location Number, that is the storage position address by which it may be fetched,
      (j) framing and inputting the researcher's free-form narrative natural language non-programmed question;
      (k) comparing each word of the question, with each of the common words stored in step (d) supra,
      (l) saving the mismatched words from the question;
      (m) adding synonyms and searchonyms to the words saved from the question in step (l) supra;
      (n) arranging the words saved from the question along with their synonyms and searchonyms in alphabetical order;
      (o) matching the words saved in step (n) supra with each word saved in step (h) supra;
      (p) copying Logical Information Unit Number, Logical Information Unit Word Frequency Number, Text Word, Frequency Number, Word Spread Number and Locical Information Unit Location Number against each word that matches from step (i) supra;
      (q) arranging the logical information unit numbers collected in step (p) supra in descending order of their frequency of citation;
      (r) presenting the logical information units to the researcher in the order established by step (q) supra on the output device; and
      (s) repeating steps (j) through (r) for the next question.

11. A Swift-Answer process for information input, storage and output comprising:
   (a) programming the electronic digital general purpose to receive plurality of bit streams of electrical signals representing common words, textual information, searchonyms, synonyms, and phononyms programming instructions and questions;
   (b) programming the computer to compute;
   (c) programming the computer to output textual and computational information;
wherein said programming instructions comprise following input procedural steps;
   (a) inputting the common words using an input device (10) such that these words, via the timing control and logic unit (20) are transferred to the storage unit (46),
   (b) inputting the text of the information, from which questions are to be asked later on, with full punctuation through the input device (10), to the text storage unit (42) under command signals from the timing control and logic unit (20)
   (c) dividing the stored textual information into logical units of information such as paragraphs, and assigning each unit a unique number, as well as a storage location number;
   (d) inputting the searchonyms directory as it relates to a particular text of information, via input device (10) and timing control and logic unit (20), for storage on the special features storage unit (50), (e) selecting the first word from the text storage unit (42) and bringing said first word to working storage (48), along with all the common words of storage unit (46) via the timing control and logic unit (20) to the working storage (48), (f) comparing said first word of the text with each word of the common words, now stored in working storage (48), and discarding such word if there is a match or storing and saving the word in case of a mismatch beyond a pre-set criteria, stored in the procedures storage unit (60), (g) repeating step (f) supra until all words of text storage unit (42) have been similarly compared;

(h) computing and storing the following information against each word saved in steps (f) and (g) supra;
  (i) Logical Information Unit Number in which said word appears,
  (ii) Logical Information Unit Word Frequency Number, that is the number of times said word appears in said logical information unit,
  (iii) Text Word Frequency Number, that is the number of times said word appears in the full text,
  (iv) Spread Number, that is the number of different Logical Information Units, in which said word appears at least once,
  (v) Logical Information Unit Location Number, that is the storage position number by which said Logical Information Unit may be addressed and fetched;

(i) adding the searchonyms to the index storage unit (44), along with the corresponding Logical Information Unit Numbers in which any word or phrase appears to which the searchonyms have the same meaning in that context;

(j) alphabetizing the words saved in index storage unit (44), and wherein said programming instructions comprise following output procedural steps:

(a) framing a free-form natural language non-pre-programmed question which can be answered by the text stored in text storage unit (42) using the information input procedure;

(b) inputting the question using input device (10) for storage on storage unit (48);

(c) comparing each word of the question with each word of the common words stored in (46) and rejecting the words that match and saving the words from the question that do not match to a pre-established criteria such as the following;
  (i) 100% match if the word is four characters or less;
  (ii) up to one character mismatch if the word is five to seven characters long;
  (iii) up to two mismatch if the word is eight or more characters long;
  (iv) if a word does not match it may be shifted up to two characters left or right for words up to six characters long;
  (v) if a word does not match, it may be shifted up to four characters left or right if the word if 7 characters or longer;
  (vi) if a word does not match, any one character may be dropped at a time to retry the match if the word is five characters or shorter, and any two characters may be dropped at a time if the word is 6 characters or longer;

(d) comparing each saved word of the question with each word of the directory of the text stored in Index Storage Unit (44), along with searchonyms, if any, of words saved from the question, (e) computing and or copying the following information against each word that matches up to the degree of said pre-established criteria;
  (i) Logical Information Unit Number in which said word appears;
  (ii) Logical Information Unit Word Frequency Number, that is the number of times said word appears in said logical information unit;
  (iii) Test Word Frequency Number, that is the number of times said word appears in full text;
  (iv) Spread Number, that is the number of different Logical Information Units, in which said word appears at least once;
  (v) Logical Information Unit Location Number, that is the storage position number by which said Logical Information Unit may be addressed and fetched;

(f) calling logical information units in descending order of frequency of citation established by the following priority criteria;
  (i) logical information units incorporating maximum number of words saved from the question;
  (ii) among those logical information units which rank equal in step (i) logical information unit most cited; that is the sum of the number of times any saved word from the question appears in that logical information unit,
  (iii) among those logical information units which rank equal in (i) and (ii) supra, logical information unit containing words least cited, including citation in other logical information units, being indicative of rarity, uniqueness and importance of the word,
  (iv) among those logical information units that rank equal in (i), (ii), and (iii) supra, the logical information unit that contains most words equally least cited;
  (v) among those logical information units which rank equal in (i) through (iv), logical information unit comprising greatest spread;
  (vi) among those logical information units that rank equal in (i) through (v), logical information unit containing least number of mismatched words, irrespective of whether the words appear in the question or not, that is to say the shortest logical information unit takes precedence if all other things are equal; and (g) reframing the question and repeating steps (b) through (f) in case of no response.

12. A method of transforming a general purpose electronic computer into a special purpose electronic computer comprising the steps of:

(a) inputting the textual information with full punctuation, to a storage device;

(b) dividing the text into logical units of information, assigning each unit a unique number, and a location number, such that it is possible to directly access that unit of information in a random manner by using the assignment or location number alone;

(c) inputting the common words, such as, "I, we, you, she, he, it, is, am, are, was, and, they, them, who, why, where, when, which, whose, whom," in the alphabetical order for storage on a device similar to that used in step (a) 'but in a separate portion thereof', (d) copying the exact text of step (a) onto preferably a more active, and easily and randomly accessible storage medium such that each logical unit of information is duplicate and available at two different locations;

(e) comparing each word of the text with each of the common words of step (c) character by character, and discarding a word from the text if a match occurs or retaining it in case of a mismatch, beyond a pre-established criteria;

(f) adding synonyms and searchonyms of the retained words to all saved words;

(g) sorting and inserting each word saved in steps (e) and (f) in its proper alphabetical order, such that the entire compilation of saved words is in alphabetical order;

(h) a posting logical information unit number and location number against each word saved in step (g) supra;

(i) framing and inputting the user's free-form narrative natural language non-programmed question;

(j) comparing each word of the question with each of the common words of step (c) and discarding the word in case of a match and saving it in case of mismatch beyond said pre-established criteria;

(k) adding synonyms and searchonyms of the saved words from the question to the words saved in step (j); this step is analogous to step (f) supra;

(l) sorting and inserting each word of step (k) in its proper alphabetical order, such that the entire compilation of the words saved from the user's question and their phononyms, synonyms, and searchonyms are in alphabetical order;

(m) matching each word saved in step (g) with each word saved in step (l);

(n) copying the logical information unit number and location number of step (h) in case of a match in step (m) up to said pre-established criteria, against each word of step (l), such that words cited plurally have multiple citations appearing against said saved words;

(o) rearranging the logical information unit numbers gleaned in step (n) supra in descending order of the frequency of their citation against all words saved in step (l), while retaining their location numbers copied in step (n);

(p) presenting the logical information units to the questioner, in the order established in step (o) on an output device provided for the purpose; and (q) repeating steps (i) through (p) in case of no responce.

13. An improvement in an inanimate computer of the type including an input device, an output device, a text storage unit, an index storage unit, a common words storage unit, a working storage unit, a special features storage unit, a procedures storage unit and a control unit connected to every unit of said inanimate computer where in said procedures storage unit stores and said control unit executes in concert with other units of said inanimate computer the following process steps;

(a) receiving and storing the text with full punctuation;

(b) receiving and storing the common words for the language of the text;

(c) comparing each word of the text with each of the common words;

(d) alphabetizing if mismatch, otherwise rejecting without destroying the text;

(e) compiling a word to text cross-reference directory;

(f) receiving and storing a free-form narrative natural language non-preprogrammed question;

(g) discarding common words from the question;

(h) comparing remaining words with indexed cross reference directory compiled in step (e) supra;

(i) copying said cross reference address information against each word that matches; and (j) presenting paragraphs of the text in descending order of their frequency of citation.

14. A full text free-form alpha-numeric narrative automated intelligent information input, storage, processing and retrieval system comprising:

(a) an input device;

(b) an output device;

(c) a text storage unit;

(d) an index storage unit;

(e) a common words storage unit;

(f) a working storage unit;

(g) a special features storage unit;

(h) a procedures storage unit; and (i) a control unit connected to said input device, said output device, said text storage unit, said index storage unit, said common words storage unit, said working storage unit, said special features storage unit, and said procedures storage unit, such that each unit of the system is capable of transferring information to and from any other unit of the system individually and collectively under command signal from the control unit, in conjunction with the procedures stored in said procedures unit which includes but is not limited to the following procedural steps:

(a) inputting the textual information with full puncutation of said text storage unit via said input device;

(b) dividing the text into logical information units such as paragraphs, and assigning each logical information unit a unique assignment number and a unique location number;

(c) inputting common words of the language of the text such as, "I, WE, YOU, HE, SHE, IT, THEY, THEM, AS, AN, AT, IN, ON, UPON, WHO, WHERE, WHY";

(d) arranging said common words in alphabetical order;

(e) establishing a match criteria;

(f) comparing said common words of step (c) supra character by character with each word of the text stored in step (a) supra;

(g) saving the word at a separate location in case of a mismatch beyond the match criteria established in step (e) supra;

(h) arranging the saved words in alphabetical order;

(i) computing and storing the following information against each saved word in the index storage unit;

(i) Logical Information Unit number in which said word appears, (ii) Logical Information Unit Word Frequency number, that is the number of times said word appears in said logical information unit, (iii) Text Word Frequency number that is the number of times the word appears in the text, (iv) Word Spread number, that is the total number of different logical information units in which said word appears at least once, (v) Logical Information Unit Location number, that is the storage position address by which it may be fetched, (j) framing and inputting the researcher's free-form narrative natural language non-preprogrammed question;

(k) comparing each word of the question, with each of the common words stored in step (d) supra, (l) saving the mismatched words from the question;

(m) adding synonyms and searchonyms to the words saved from the question in step (l) supra;

(n) arranging the words saved from the question along with their synonyms and searchonyms in alphabetical order;

(o) matching the words saved in step (n) supra with each word saved in step (h) supra;

(p) copying Logical Information Unit number, Logical Information Unit Word Frequency number, Text Word Frequency number, Word Spread number and Logical Information Unit Location number against each word that matches from step (i) supra;

(q) arranging the logical information unit numbers collected in step (p) supra in descending order of their frequency of citation;

(r) presenting the logical information units to the researcher in the order established by step (q) supra on the output device; and (s) repeating steps (j) through (q) for the next question.

15. A full text free-form alpha-numeric narrative automated intelligent information input, storage, processing and retrieval system comprising:

(a) an input device;
(b) an output device;
(c) a text storage unit;
(d) an index storage unit;
(e) a common words storage unit;
(f) a working storage unit;
(g) a special features storage unit;
(h) a procedures storage unit; and
(i) a control unit connected to said input device, said output device, said text storage unit, said index storage unit, said common words storage unit, said working storage unit, said special features storage unit, and said procedures storage unit, such that each unit of the system is capable of transferring information to and from any other unit of the system individually and collectively under command signal from the control unit, in conjunction with the procedures stored in said procedures unit which includes but is not limited to the following input procedural steps:

(a) inputting plurality of common words such as, "I, WE, YOU, HE, SHE, IT, AS, AN, AT, AM, ARE, WAS, IS, ON, IN, WHO, WHERE, WHICH, WHY, WHEN", through the input device;

(b) arranging the common words in alphabetical order;

(c) storing the common words on the storage unit;

(d) inputting the full text with punctuation into the storage device via the input unit;

(e) dividing the text into logical information units;

(f) assigning each logical information unit a unique Logical Information Unit Number;

(g) assigning a unique address to each logical information unit;

(h) comparing each word of the text with each word of the common words;

(i) saving the words that do not match according to the following criteria:
 (i) less than 100% match if the word is four characters or shorter,
 (ii) more than one character mismatch for words between 5 and 7 characters in length,
 (iii) more than two errors for words of 8 characters or longer,
 (iv) if the word requires more than two characters shift left or right from the middle character for words up to 6 characters long,
 (v) if the word requires more than 4 characters shift left or right if the word is 7 characters or longer,
 (vi) retry requires dropping more than one character for words up to five characters in length,
 (vii) retry requires dropping more than two characters for six characters or longer words;

(j) compiling a cross-reference index directory by computing and copying the following information against each word saved:
 (i) Logical Information Unit number in which said word appears,
 (ii) Logical Information Unit Word Frequency Number, that is the number of times said word appears in said logical information unit,
 (iii) Text Word Frequency Number, that is the number of times said word appears in the full text,
 (iv) Word Spread Number, that is the number of different logical information units in which said word appears at least once,
 (v) Logical Information Unit Address, that is the storage position number by which said information unit may be fetched;

(k) adding synonyms and searchonyms and storing them on the Index Storage Unit under command signal from the control unit;

(l) compiling and storing an alphabetized synonym and searchonym directory for later reference in the output procedure via said special features storage unit;

(m) copying the cross-reference index information against synonyms and searchonyms from the word to which they are synonym or searchonyms; and (n) alphabetizing the saved words from the text along with their synonyms and searchonyms and corresponding information.

16. A full text free-form alpha-numberic narrative automated intelligent information input, storage, processing and retrieval system comprising:

(a) an input device;
(b) an output device;
(c) a text storage unit;
(d) an index storage unit;

(e) a common words storage unit;
(f) a working storage unit;
(g) a special features storage unit;
(h) a procedures storage unit; and
(i) a control unit connected to said input device, said output device, said text storage unit, said index storage unit, said common words storage unit, said working storage unit, said special features storage unit, and said procedures storage unit, such that each unit of the system is capable of transferring information to and from any other unit of the system individually and collectively under command signal from the control unit, in conjunction with the procedures stored in said procedures unit which includes but is not limited to the following steps in its output procedure:
(a) framing a free-form narrative natural language non-preprogrammed question;
(b) inputting the question via the input device to the text storage unit;
(c) accessing the common words from the common words storage unit and fetching them into the working storage unit;
(d) comparing each word of the question with each common word of said common words storage unit;
(e) establishing a match criteria;
(f) rejecting the words from the question that satisfy the match criteria established in step (e) supra;
(g) saving and storing the words from the question that does not satisfy the match criteria established in step (e) supra;
(h) comparing each saved word from the question against each word stored in the index storage unit;
(i) copying the following information from the index storage unit against each word that matches from the question up to the match criteria established in step (e) supra;
  (i) Logical Information Unit Number,
  (ii) Logical Information Unit Word Frequency Number,
  (iii) Text Word Frequency Number,
  (iv) Word Spread Number,
  (v) Logical Information Unit Address;
(j) computing priority of presenting information to the researcher according to the following priority criteria;
  (i) Logical Information Unit incorporating maximum number of words saved from the question,
  (ii) Logical Information Unit most cited,
  (iii) Logical Information Unit containing words least cited,
  (iv) Logical Information Unit that comprises most words equally least cited,
  (v) Logical Information Unit containing word with greatest spread,
  (vi) Logical Information Unit containing least number of mismatched words,
  (vii) Shortest Logical Information Unit with Least words;
(k) presenting logical information units in the order of the priority established in step (j) supra to the output device;
(l) adding synonyms and searchonyms to the words saved from the question by utilizing the synonym and searchonyms directory stored in the special features storage unit, in case of no response and repeating steps (h) through (k); and
(m) reframing the question in case of no response and repeating steps (b) through (l) supra.

17. An automated information input, storage and retrieval SWIFT-ANSWER system comprising:
(a) a timing control and logic unit;
(b) plurality of storage devices connected to said timing control and logic unit;
(c) a first means for inputting textual information into one of said plurality of storage devices and connected to said timing control and logic unit;
(d) a second means for dividing the textual information into logical units and assigning each of said logical units a unique assignment number and a unique location number and connected to said timing control and logic unit;
(e) a third means for inputting common words such as, "I, WE, YOU, HE, SHE, IT, THEY, THEM, AS, AN, IN, ON", into one of said plurality of storage devices and connected to said timing control and logic unit;
(f) a fourth means for arranging said common words in an alphabetical order and connected to said timing control and logic unit;
(g) a fifth means for comparing said common words with each word of the text character by character and connected to said timing control and logic unit;
(h) a sixth means for transferring textual words that do not match with any of the common words into one of said plurality of storage devices and connected to said timing control and logic unit;
(i) a seventh means for arranging the textual words that do not match with any of the common words, in an alphabetical order, and connected to said timing control and logic unit;
(j) an eighth means for adjoining said unique assignment number and said unique location number with textual words that do not match with any of the common words, and connected to said timing control and logic unit;
(k) a ninth means for inputting a researcher's free-form narrative natural language non-preprogrammed question into one of said plurality of storage devices and connected to said timing control and logic unit;
(l) a tenth means for comparing said common words with each word of the question character and connected to said timing control and logic unit;
(m) an eleventh means for transferring question words that do not match with any of said common words into one of said plurality of storage devices and connected to said timing control and logic unit;
(n) a twelveth means for arranging question words that do not match with any of said common words in an alphabetical order and connected to said timing control and logic unit;
(o) a thirteenth means for comparing said question words that do not match with common words with said textual words that do not match with common words, character by character and connected to said timing control and logic unit;
(p) a fourteenth means for transferring question words that match with said textual words of said first means supra to one of said plurality of storage devices and connected to said timing control and logic unit;

(q) a fifteenth means for adjoining said unique assignment number and said unique location number to said question that match words of said fourteenth means and connected to said timing control and logic unit;
(r) a sixteenth means for rearranging said question words that match of said fourteenth means in descending order of frequency of said unique assignment number and connected to said timing control and logic unit; and
(s) a seventeenth means for outputting said logical units of said second means according to the priority established in said sixteenth means supra and connected to said timing control and logic unit.

* * * * *